US006817013B2

(12) United States Patent
Tabata et al.

(10) Patent No.: US 6,817,013 B2
(45) Date of Patent: Nov. 9, 2004

(54) PROGRAM OPTIMIZATION METHOD, AND COMPILER USING THE SAME

(75) Inventors: Kunio Tabata, Yokohama (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 09/970,025

(22) Filed: Oct. 4, 2001

(65) Prior Publication Data

US 2002/0095666 A1 Jul. 18, 2002

(30) Foreign Application Priority Data

Oct. 4, 2000 (JP) ........................................ 2000-304618

(51) Int. Cl.[7] ................................................ G06F 9/45
(52) U.S. Cl. ........................ 717/151; 717/127; 717/128; 717/130; 717/136; 717/139; 717/140; 712/233; 712/234; 712/235; 712/239; 718/106
(58) Field of Search ................................ 717/127–132, 717/151, 140, 136, 138, 139; 712/233–239; 718/106

(56) References Cited

U.S. PATENT DOCUMENTS

| | | | | |
|---|---|---|---|---|
| 5,124,910 A | * | 6/1992 | Koumoto et al. | 712/234 |
| 5,193,186 A | * | 3/1993 | Tamaki et al. | 718/106 |
| 5,471,593 A | * | 11/1995 | Branigin | 712/235 |
| 5,742,803 A | * | 4/1998 | Igarashi et al. | 712/233 |
| 5,758,162 A | * | 5/1998 | Takayama et al. | 717/151 |
| 5,832,289 A | * | 11/1998 | Shaw et al. | 712/30 |
| 6,052,776 A | * | 4/2000 | Miki et al. | 712/233 |
| 6,311,327 B1 | * | 10/2001 | O'Brien et al. | 717/114 |

OTHER PUBLICATIONS

Title: Automating parallel runtime optimization using post–mortem analysis, author: Krishnan et al, ACM, 1996.*
Title: Speculative Execution and Branch Predicition on Parallel Machine, author: Theobald et al, ACM, 1993.*
D. I. August, et al., "A Framework for Balancing Control Flow and Predication", in Proceedings of the 30th International Symposium on Microarchitecture, Dec. 1997.
S.A. Mahlke, et al., "Effective Compiler Support for Predicated Execution Using the Hyperblock", in Proceedings of the 25th International Symposium on Microarchitecture, pp. 45–54, Dec. 1992.

* cited by examiner

*Primary Examiner*—Chameli C. Das
(74) *Attorney, Agent, or Firm*—Richard M. Ludwin, Esq.; McGinn & Gibb, PLLC

(57) ABSTRACT

An optimization method and apparatus for converting source code for a program written in a programming language into machine language. The program includes a basic block as a unit to estimate an execution time for the program to be processed, generating a nested tree that represents the connections of the basic blocks using a nesting structure, when a conditional branch is accompanied by a node in the nested tree, employing the execution time estimated by using the basic blocks as units to obtain an execution time at the node of the program when a conditional branching portion of a program is directly executed and when the conditional branching portion is executed in parallel, and defining the node as a parallel execution area group when the execution time required for the parallel execution is shorter or dividing multiple child nodes of the nodes into multiple parallel execution areas.

15 Claims, 42 Drawing Sheets

Control flow graph

| | |
|---|---|
| W | Parallel level (constant) of hardware. |
| w, w1, w2 | Mainly represents the parallel level of hardware.<br>Used as the induction variable of a loop. Appears locally. |
| node | Represents one node in a series – parallel nested tree. |
| node.attribute | Indicates that a node is either a basic block,<br>a series suite or a parallel suite. |
| node.cl | Critical path length of a suite represented by a node<br>(defined only when a node is a basic block). |
| node.all | Total execution time for a node. |
| node.child1<br>node.child2 | Represents a series suite, a parallel suite or a basic block inside a nested node (defined only when a node is a series suite or a parallel suite). |
| node.dep_path[n]<br>node.dep_path.in<br>node.dep_path.out<br>node.dep_path.length<br>node.n_dep_path | List of dependence paths in an area indicated by a node. Generated when code scheduling of basic blocks is performed by the second method for hyperblock selection process. dep_path.length is a pointer to a DAG node positioned at the head of a dependence path, while dep_path.out is a pointer to a DAG node positioned at the tail of a dependence path. |
| node.best_time[w] | Estimated shortest processing time for a suite indicated by a node. The definition range is $1 \leq w \leq W$. |
| node.best_time2[w] | Estimated processing time for a node when the critical path length is ignored. Permits an operation wherein the execution time is smaller than the value representing the critical path length. The second method is used for estimating the time for the hyperblock selection process, and is used for estimating the execution time for a series suite. The definition range is $1 \leq w \leq W$. |
| node.hyper_block | Either TRUE or FALSE as a value. The value TRUE is established for generation of an independent hyperblock. |

Fig. 7

Pseudo program for transforming a PDG into a series – parallel graph

```
Input: PDG, dominator tree of the PDG
Output: transformed PDG
for n in all the PDG node
begin
    if(the number of predecessor of n is more than 1)
    begin
        for all the combination(p1, p2) of the predecessor of n
        begin
            if(p1 dominates p2)
                remove an edge from p1 to n
            if(p2 dominates p1)
                remove an edge from p2 to n
        end
    end
end
```

Pseudo program for generating a series – parallel nested tree

Input: Series-Parallel Graph
Output: suite nest tree apply following "algorithm" to the header node of Series-Parallel Graph
algorithm(node)
begin
　allocate new root R of suite nest tree
　if(node has more than 1 successor)
　begin
　　for each successor s(i) of node
　　begin
　　　put (recursively called)algorithm(s(i)) as the leaf of R
　　end
　　R.attribute = parallel suite;
　　return R;
　end
　else
　begin
　　put (recursively called)algorithm(the successor of node) as the leaf of R
　　R.attribute = series suite;
　　return R;
　end
end Pseudo program for hyperblock selection process

```
Hyper_Block_Selector(Node node)
begin
    switch(node.attribute)
    begin
    case: single node
        ***********************************
        single node
        ***********************************
        singlenode_evaluator(node);
        return;
    break;
    case: Series-Suite
        ***********************************
        Series Suite
        ***********************************
        Hyper_Block_Selector(node.child1);
        Hyper_Block_Selector(node.child2);
        series_suite_evaluator(node.child1,node.child2)
        break;
    case: Parallel-Suite
        ***********************************
        Parallel Suite
        ***********************************
        Hyper_Block_Selector(node.child1);
        Hyper_Block_Selector(node.child2);
        // do parallel schedule
        parallel_suite_evaluator(node.child1,node.child2);

// whether hyperblock is formed or not
        gain = gain_estimator(node.child1, node.child2, node);
        if( gain <= 0 )
        begin
            //choose one with some heuristics
            //the other is flaged as separate hyper_block
            node_selector(node.child1, node.child2);
        end
        else
            node.all = node.child1.all + node.child2.all;
        break;
    end of switch
end
```

Fig. 12

Pseudo program for execution time evaluation process for parallel suite

```
procedure parallel_suite_evaluator(node, child1, child2)
begin
int min, w1, w2;
for w1=1 to W
begin
    min = infinite;
    for w2=1 to w1
    begin
        min = min( min, max(child1.best_time[w2], child2.best_time[w1-w2] );
    end
    node.best_time[w1] = min;
end
end
```

```
Pseudo program for gain estimation process procedure gain_estimator(node)
  return branch_penalty+(node.child1.best_time[W]+node.child2.best_time[W])/2
         - node.best_time[W] ;
```

Fig. 19

Pseudo program for node selection process

```
procedure node_selector(child1, child2)
begin
    if(child1.best_time[W] > child2.best_time[W])
    begin
        node.child2.hyper_block=TRUE;
        copy node.child1.best_time to node.best_time;
        copy node.child1.dep_path to node.dep_path;
    end
    else
    begin
        node.child1.hyper_block=TRUE;
        copy node.child2.best_time to node.best_time;
        copy node.child2.dep_path to node.dep_path;
    end
end
```

Fig. 21

Pseudo program for execution time evaluation process for series suite

```
procedure series_suite_evaluator(node, child1, child2)
begin
  int w;
  node.all = node.child1.all + node.child2.all;
  for w=1 to W
  begin
    node.best_time[w] = node.child1.best_time[w] + node.child2.best_time[w];
    if(node.best_time[w] * w != node.child1.all+ node.child2.all)
      node.best_time[
         (node.child1.all+node.child2.all)/node.best_time[w]
      ] = node.best_time[w];
  end
end
```

Pseudo program for execution time evaluation process for independence node

```
procedure singlenode_evaluator(node, w)
    return max(node.all/w, node.cl);
```

Fig. 23

| Suite/parallel level | 1 | 2 | 3 | 4 | 5 | 6 |
|---|---|---|---|---|---|---|
| A | 6 | 3 | 3 | 3 | 3 | 3 |
| B | 12 | 6 | 4 | 4 | 4 | 4 |
| C | 3 | 2 | 1 | 1 | 1 | 1 |
| D | 3 | 3 | 3 | 3 | 3 | 3 |
| E | 8 | 4 | 3 | 2 | 2 | 2 |
| F | 1 | 1 | 1 | 1 | 1 | 1 |
| G | 2 | 1 | 1 | 1 | 1 | 1 |
| 0(*) | 35 | 19 | 16 | 15 | 10 | 10 |
| 1 | 33 | 18 | 15 | 14 | 9 | 9 |
| 2 | 27 | 15 | 12 | 11 | 6 | 6 |
| 3 | 15 | 11 | 6 | 5 | 5 | 5 |
| 4 | 14 | 10 | 5 | 4 | 4 | 4 |
| 5 | 11 | 8 | 4 | 3 | 3 | 3 |

Fig. 24

| Suite/parallel level | 1 | 2 | 3 |
|---|---|---|---|
| A | 6 | 3 | 3 |
| B | 12 | 6 | 4 |
| C | 3 | 2 | 1 |
| D | 3 | 3 | 3 |
| E | 8 | 4 | 3 |
| F | 1 | 1 | 1 |
| G | 2 | 1 | 1 |
| 0(*) | 20 | 10 | 8 |
| 1 | 18 | 9 | 7 |
| 2 | 12 | 6 | 4 |
| 3(*) | 16 | 11 | 6 |
| 4 | 15 | 10 | 5 |
| 5 | 12 | 8 | 4 |

Fig. 25

Pseudo program for execution time evaluation process for parallel suite

```
procedure parallel_suite_evaluator(node, child1, child2)
begin
int min = infinite;
int min2 = infinite;
int w1, w2, n, n1, n2;
for w1=1 to W
begin
   for w2=1 to w1
   begin
      min = min( min, max(child1.best_time[w2], child2.best_time[w1-w2] );
      min2 = min( min2, max(child1.best_time2[w2], child2.best_time2[w1-w2] );
   end
   node.best_time[w1] = min;
   node.best_time2[w1] = min2;
end // merage child1.dep_path & child2.dep_path into node.dep_path
n1 = 0;   n2 = 0;
for n = 0 to node.n_dep_path - 1
   if(child1.dep_path[n1].length > child2.dep_path[n2].length)
      node.dep_path[n] = child1.dep_path[n1++];
   else
      node.dep_path[n] = child2.dep_path[n2++];
end
node.n_dep_path = child1.n_dep_path + child2.n_dep_path;
end
```

Fig. 29

Pseudo program for execution time evaluation process for series suite

```
procedure series_suite_evaluator(child1, child2, w)
begin
int w, n1, n2, idx=0;

//critical path calcuration
for n1=0 to child1.n_dep_path - 1
begin
   for n2=0 to child2.n_dep_path - 1
   begin
      if( child1.dep_path[n1].out  depends on  child2.dep_path[n2].in )
      begin
         concatinate child1.dep_path[n1] & child2.dep_path[n2] as
            node.dep_path[idx];
         node.dep_path[idx].length =
            child1.dep_path[n1].length + child2.dep_path[n2].length
      end
   end
end
sort node.dep_path[idx];
node.cl = node.dep_path[0];

//best_time calcuration
for w=1 to W
begin
   tmp = child1.best_time2[w] + child2.best_time2[w];
   node.best_time[w] = max(node.cl, tmp);
   node.best_time2[w] = tmp;
end
end of procedure
```

Fig. 32

Pseudo program for execution time evaluation process for independence node

```
procedure singlenode_evaluator(node)
begin
int w;
for w = 1 to W
begin
    node.best_time2[w] = node.all/w;
    node.best_time[w] = max(node.all/w, node.cl);
end
end
```

Fig. 36

| Suite/parallel level | 1 | 2 | 3 | 4 | 5 | 6 |
|---|---|---|---|---|---|---|
| A | 6 | 3 | 3 | 3 | 3 | 3 |
| B | 12 | 6 | 4 | 4 | 4 | 4 |
| C | 3 | 2 | 1 | 1 | 1 | 1 |
| D | 3 | 3 | 3 | 3 | 3 | 3 |
| E | 8 | 4 | 3 | 2 | 2 | 2 |
| F | 1 | 1 | 1 | 1 | 1 | 1 |
| G | 2 | 1 | 1 | 1 | 1 | 1 |
| 0 | 36 | 20 | 16 | 13 | 10 | 10 |
| 1 | 34 | 19 | 15 | 14 | 9 | 9 |
| 2 | 28 | 16 | 12 | 11 | 6 | 6 |
| 3 | 16 | 11 | 6 | 6 | 5 | 4 |
| 4 | 15 | 10 | 5 | 4 | 4 | 4 |
| 5 | 12 | 8 | 4 | 3 | 3 | 3 |

Fig. 37

| Suite/parallel level | 1 | 2 | 3 | 4 | 5 | 6 |
|---|---|---|---|---|---|---|
| A | 6 | 3 | 2 | 2 | 1 | 1 |
| B | 12 | 6 | 4 | 3 | 2 | 2 |
| C | 3 | 2 | 1 | 1 | 1 | 1 |
| D | 3 | 2 | 1 | 1 | 1 | 1 |
| E | 8 | 4 | 3 | 2 | 2 | 1 |
| F | 1 | 1 | 1 | 1 | 1 | 1 |
| G | 2 | 1 | 1 | 1 | 1 | 1 |
| 0 | 36 | 20 | 15 | 14 | 8 | 8 |
| 1 | 34 | 19 | 14 | 13 | 7 | 7 |
| 2 | 28 | 16 | 12 | 11 | 6 | 6 |
| 3 | 16 | 11 | 6 | 6 | 5 | 4 |
| 4 | 15 | 10 | 5 | 5 | 4 | 3 |
| 5 | 12 | 8 | 4 | 4 | 3 | 2 |

Fig. 38

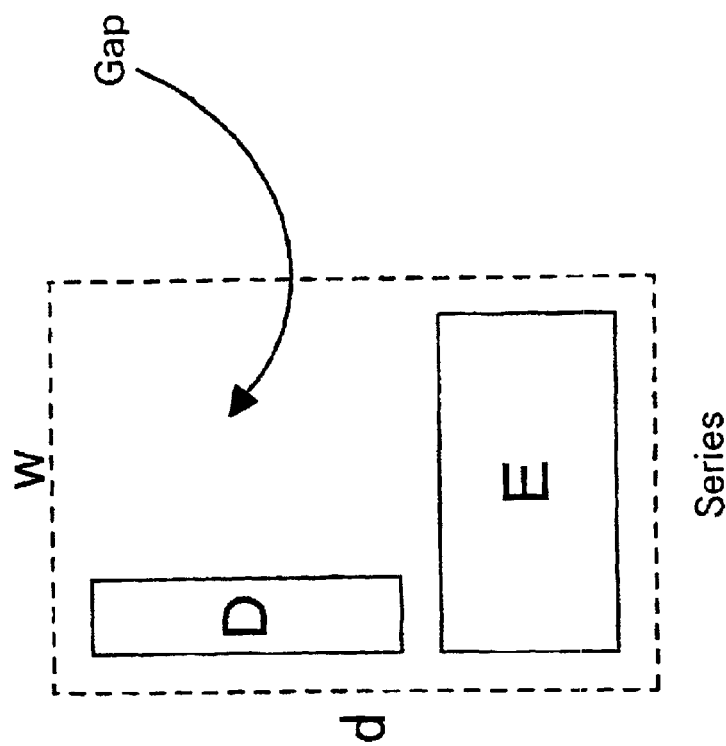
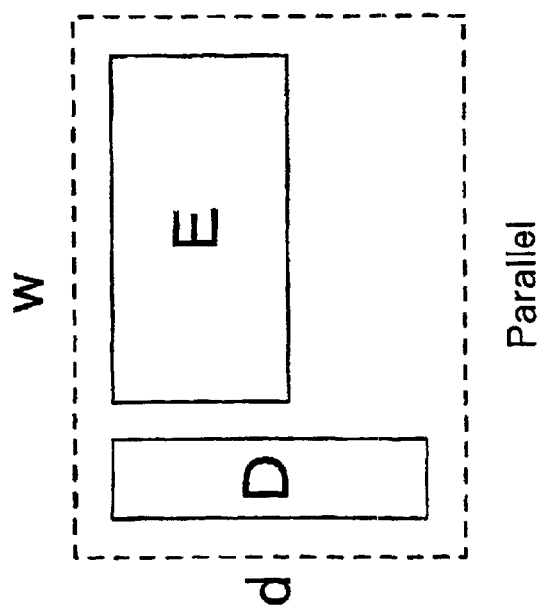
Fig. 40

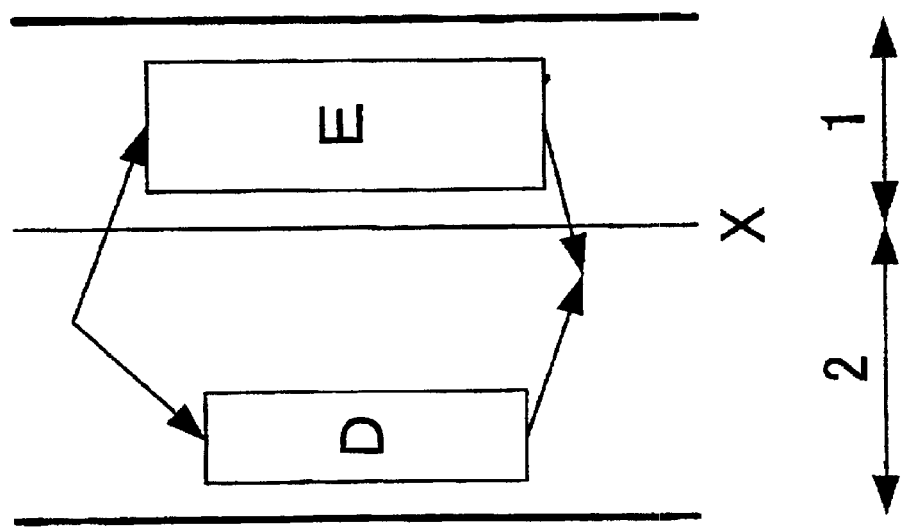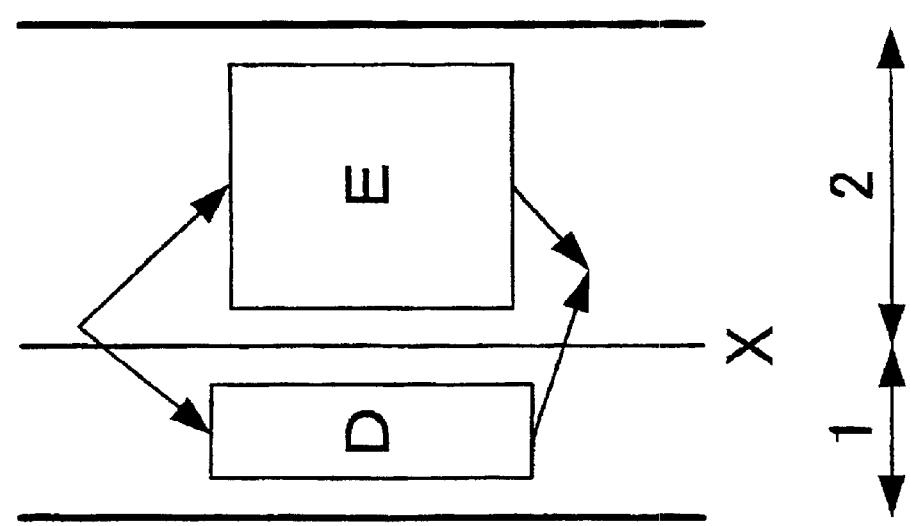
Fig. 41

PROGRAM OPTIMIZATION METHOD, AND COMPILER USING THE SAME

BACKGROUND OF THE INVENTION

1. Field of the Invention

The present invention relates to a computer program optimization method, and in particular, to a method for editing a program optimization area in order to efficiently perform optimization by rewriting a conditional branching portion of a program to obtain a portion for parallel execution.

2. Description of the Related Art

Generally, in the process during which the source code of a program written in a programming language is compiled, optimization of the program is performed in order to improve the speed at which the program can be executed by a computer.

A variety of optimization methods are in use today. For example, processors, such as CPUs produced by Intel and Hewlett Packard, which are compatible with IA-64 architecture and capable of performing parallel processing while using VLIWs (Very Long Instruction Words), can execute predicated instructions and perform parallel processing at the instruction level. These processors can delete a branching instruction and execute, in parallel, a branching instruction group in a complementary predicated manner (e.g., a conversion of an instruction group hereinafter referred to as an IF conversion). As a result of an IF conversion, the number of instructions can be reduced and a branching prediction failure can be avoided and thus program execution efficiency can be increased.

An IF conversion may also deteriorate execution efficiency, depending on how the instructions for the conversion are selected. The causes of a deterioration in efficiency may be an excessive parallel level extending beyond the hardware limit, a rise in the register pressure, an inferior balance of the critical path length of the branching instruction, or the insertion of a rarely executed instruction.

In order to determine the program execution efficiency level while taking these factors into account, a code schedule must be executed for each branching instruction, both for the case where an IF conversion is to be performed and for the case where an IF conversion is not performed, and the number of actual instruction cycles estimated for each of the two cases and compared.

However, when the number of instruction cycles is estimated and compared for all the branching instructions in a program, the number of combinations becomes enormous, and termination of the estimation process within a realistic calculation time is not possible. Thus, an area for the execution of an optimization (e.g., hereinafter referred to as a hyperblock and shown using a quadrilateral) must be appropriately selected.

Therefore, conventionally, two methods are employed in order to determine within a realistic time whether an IF conversion should be performed. In a first method, an IF conversion is performed, as needed, only for branching instructions along an execution path (e.g., a main trace) for which it is predicted that the execution probability is the highest. In a second method, an IF conversion is performed, as needed, for temporarily optimizing all the branching instructions, and for performing, as needed, a conversion in the direction opposite to that of an IF conversion (e.g., a reverse IF-conversion) during the list scheduling and the reproduction of the branching instructions, The conventional technique for performing an IF conversion, as needed, only for branching instructions in the main trace (e.g., the first method) is disclosed in "Effective Compiler Support For Predicated Execution Using The Hyperblock" (S. A. Mahlke, R. E. Hank, R. A. Bringmann, in Proceedings of the 25th International Symposium on Microarchitecture, pp.45–54, December 1992).

The conventional technique of the first method provides a solution using a discovery method to determine for which area should parallel execution and an IF conversion be performed, in order. According to the article, first, the main trace is specified, and an IF conversion is unconditionally performed for this path. Then, a check is performed to determine whether each path other than the main trace (e.g., a sub trace) should be included in the same parallel execution area, and the area for which an IF conversion is performed is gradually increased.

Whether an IF conversion should be performed for a specific branching instruction is determined considering four conditions including whether in the sub trace there is an instruction that will disturb a pipe line, the probability that relative to the main trace a sub trace will be executed, the ratio of the number of instructions in the machine language of the sub trace to the number in the main trace, and the limits of the parallel processing hardware capabilities.

According to this method, when the number of branching instructions in the main trace is denoted by n, only the calculation amount proportional to n is required to terminate the determination performed to ascertain whether an IF conversion should be performed.

The conventional technique for temporarily optimizing all the branching instructions by performing an IF conversion and for performing a reverse IF-conversion (e.g., the second method), as needed, during the list scheduling and the reproduction of the branching instructions is disclosed in "A Framework for Balancing Control Flow And Prediction" (D. I. August, W. W. Hwu, S. A. Mahlke, in Proceedings of the 30th International Symposium On Microarchitecture, December 1997).

According to this article, first, the overall program is defined as a single parallel execution area, and an IF conversion is performed for all the branching instructions. Then, various optimization processes are performed for the obtained program, and a reverse IF-conversion is selectively performed. As a result, a state is provided where an IF conversion has been selectively performed for the branching instructions.

According to the second method, in coordination with the code scheduler, the number of execution cycles for each branching instruction is obtained both for a case where a reverse IF-conversion has been performed and a case where a reverse IF-conversion has not been performed. Then, the execution performances are compared to determine whether a reverse IF-conversion should be performed.

However, when this method is employed for all the branching instructions in a function, as well as during a determination performed to ascertain whether an IF conversion should be performed, the number of target instruction combinations for a reverse IF-conversion becomes enormous. Thus, a reverse IF-conversion is performed only when the critical path is to be scheduled in coordination with the list scheduler, so that an increase in the number of calculations is suppressed.

In the above-mentioned article by August et al., a method is proposed where scheduling is performed approximately 2n times, where n denotes the number of branching instructions. The critical path is the longest instruction string, in a specific range within a program, of the series of instruction strings that can not be executed in parallel.

However, while the first method, for performing an IF conversion as needed only for branching instructions in the main trace, can improve the execution efficiency for the main trace, it does not especially affect execution efficiency relative to the sub trace. Therefore, overall execution efficiency for a program cannot always be improved.

Further, where there is no particular path whose execution probability is high and for which a main trace can be strictly specified, it is difficult to determine a path along which an IF conversion should be performed. Additionally, even when an IF conversion is performed for a path based on a specific reference, the execution probabilities for other paths are also high. Thus, the program execution efficiency can not satisfactorily be increased.

Furthermore, according to the second method for temporarily optimizing all the branching instructions through an IF conversion, and for performing reverse IF-conversions as needed during the list scheduling and the reproduction of the branching instructions, the target path for a reverse IF-conversion is selected during the list scheduling. However, whether an IF conversion should be performed is determined for a predetermined path (e.g., in this case, whether the branching instruction should be reproduced by a reverse IF-conversion). Since this determination is made by executing code for scheduling both a case where an IF conversion is performed and a case where an IF conversion is not performed, and by comparing the results, a large number of calculations are required.

That is, in this conventional technique, as well as in the determination performed to ascertain whether an IF conversion should be performed, in principle, a tradeoff exists between the size of an area for which an IF conversion is employed and the speed of the compiler.

As described above, according to these conventional techniques, overall execution efficiency cannot be satisfactorily improved by a practical general-purpose compiler, especially a language processing system, such as the Just-In-Time Compiler for Java®, that limits the compiling time.

Since satisfactory execution time information cannot be obtained by an actual general-purpose language processing system, it is difficult to specify an exact path to be optimized, such as a main trace. Thus, this problem is critical.

SUMMARY OF THE INVENTION

In view of the foregoing and other problems of the conventional systems and methods, therefore, it is an object of the invention to provide an optimization method for dividing a wide area into hyperblocks within a limited time, and for improving the execution efficiency for many paths having execution probabilities that are high.

To achieve this object, according to the invention, the estimated shortest processing time required when an overall predetermined area (e.g., instruction queue a) of a program is executed in parallel is recurrently calculated using the estimated shortest processing time for one part (e.g., instruction queue b or c) of the pertinent area. Then, the execution efficiency of the instruction queue a is compared with the execution efficiency attained when the instruction queues b and c are sequentially executed. When the execution efficiency for the instruction queue a is lower, the instruction queues b and c are formed as independent hyperblocks, and overall, the area in the program that is to be optimized is divided into multiple, appropriate hyperblocks.

According to the present invention, an optimization method for converting source code for a program written in a programming language into machine language, and for optimizing the program includes employing a basic block as a unit to estimate an execution time for the program to be processed, generating a nested tree that represents the connections of the basic blocks using a nesting structure, when a conditional branch is accompanied by a node in the nested tree, employing the execution time estimated by using the basic blocks as units to obtain an execution time at the node of the program for a case where a conditional branching portion of a program is directly executed and for a case where the conditional branching portion is executed in parallel, defining the node as a parallel execution area group when, as a result of an estimate, the execution time required for the parallel execution is shorter, or dividing multiple child nodes of the nodes into multiple parallel execution areas when the execution time for the conditional branching portion is shorter.

According to the optimization method, especially when the program is to be executed by a computer that can execute the predicated instruction and that can perform parallel execution at an instruction level, if the parallel execution at the instruction level is faster than the execution of the conditional branching portion, the conditional branching portion can be rewritten as a parallel execution portion.

The process of estimating the execution time for the program using the basic block as a unit includes employing the thus estimated execution time to obtain the critical path length for the program portion in the basic block, and the average parallel level of the program portion.

The basic block can be represented as a rectangle whose sides consist of the critical path length and the average parallel level. This rectangle can be deformed within a range where the side corresponding to the critical path length is not shorter than the critical path length.

The critical path length obtained for the basic block is the length of the longest instruction queue in the basic block that must be executed as needed in accordance with the dependency. The average level is the value obtained by dividing the number of all the instructions (e.g., corresponding to the total execution time) by the critical path length. That is, the parallel level that is represented is required when the instruction queues for the basic block are executed in parallel while the critical path length is maintained.

When the average parallel level is defined, and when multiple basic blocks are executed in parallel, a required parallel level is approximated when it reaches the linear sum of the average parallel levels of the basic blocks.

The generating of the nested tree includes generating a dependency graph that represents the dependency existing between the basic blocks, generating a preceding limitation graph by removing redundant branches from the dependency graph, and generating the nested tree in the preceding limitation graph by using a nesting structure to represent a connection consisting of node relationships.

The nodes of the nested tree are basic blocks of the program, the series suite and the parallel suite. The series suite is the connection in series of the basic blocks or of dependent suites, and the parallel suite is a parallel arrangement of basic blocks or other suites that evidence no dependency. That is, when the basic blocks or suites are grouped as the series suite or the parallel suite, this arrangement represents the nesting structure of the program.

The determining of the execution time for the conditional branching portion includes obtaining, for each of the parallel levels executable for the child node, the maximum execution time required when the child node is executed in parallel, and regarding a specific value derived from the maximum execution values of the parallel levels as the execution time that is required when the conditional branching portion is executed in parallel.

The determining of the execution time for the conditional branching portion includes employing the dependency at the instruction level between the basic blocks that serve as the child nodes to, before the determination of the execution time, correct information concerning execution times for the basic blocks.

Specifically, for the basic blocks forming the series suite, when the dependency is established between instructions other than the last instruction in the basic block and the first instruction in the following basic block, the series suite can be executed while the length (e.g., the critical path length of the series suite) is shorter than the simple connection, in series, of the basic blocks.

Further, determining the parallel execution area for the program includes comparing, when multiple child nodes are sorted into multiple parallel execution areas, the execution times required for the child nodes when the child nodes are executed in parallel at the parallel level provided for the hardware, and defining, as independent parallel execution areas, child nodes other than the child node whose execution time is the shortest.

Furthermore, the present invention either can be provided as a storage medium, in which is stored a computer program that is prepared to permit a computer to employ the above described optimization methods for compiling a program, or can be provided as a transmission apparatus, for transmitting the computer program.

According to the invention, a compiler for converting source code for a program written in a programming language into machine language, and for optimizing the program includes a first code scheduler for estimating the execution time for the program by using basic blocks as units, a hyperblock generator for assembling the basic blocks to generate hyperblocks as parallel execution areas, an execution time estimation unit for supporting the generation of the hyperblocks by the hyperblock generator by estimating the processing time required when a predetermined area of the program is executed, and a second code scheduler for performing code scheduling for each of the generated hyperblocks, where, when a predetermined node of a nested tree for which the connection of the basic blocks is represented using a nesting structure, based on the execution time, which has been estimated by using the basic blocks as units, the execution time estimation unit estimates the execution time required for the node of the program both for a case where a conditional branching portion of a program is directly executed and for a case where the conditional branching portion is executed in parallel, and where the hyperblock generator defines, as one parallel execution area group, a node for which the execution time estimated for the parallel execution by the execution time estimation unit is shorter, or for dividing, into multiple parallel execution areas, multiple child nodes of the node for which the execution time is shorter when execution of the conditional branching portion is directly performed.

The first code scheduler employs the execution time estimated by using the basic blocks as units to obtain the critical path length for the program portion in the basic block and the average parallel level of the program portion.

Before the determination of the execution time, the execution time estimation unit corrects information concerning the execution time for the basic block based on the dependency, at the instruction level for the basic block, that constitutes the child node.

The present disclosure relates to subject matter contained in Japanese Patent Application No. 2000-304618, filed Oct. 4, 2000, which is expressly incorporated herein by reference in its entirety.

BRIEF DESCRIPTION OF THE DRAWINGS

The foregoing and other objects, aspects and advantages will be better understood from the following detailed description of preferred embodiments of the invention with reference to the drawings, in which:

FIG. 7 is a table showing the definitions for symbols that are used in the explanation given for the operation of the embodiment;

FIG. 8 is a diagram showing a pseudo program for an algorithm for transforming a PDG into a series-parallel graph;

FIG. 9 is a diagram showing a pseudo program for an algorithm for generating a series-parallel nested tree using a series-parallel graph;

FIG. 12 is a diagram showing a pseudo program for the algorithm of the operation in FIG. 11;

FIG. 15 is a diagram showing a pseudo program for the operation algorithm of the execution time evaluation process in FIG. 14;

FIG. 17 is a diagram showing a pseudo program for the operation algorithm of the gain estimation process in FIG. 16;

FIG. 19 is a diagram showing a pseudo program for the operation algorithm of the node selection process in FIG. 18;

FIG. 21 is a diagram showing a pseudo program for the operation algorithm of the execution time evaluation process in FIG. 20;

FIG. 23 is a diagram showing a pseudo program for the operation algorithm of the execution time evaluation process in FIG. 22;

FIG. 24 is a diagram showing the shortest processing times estimated at parallel levels 1 to 6 for each node (suite) of the series-parallel nested tree in FIG. 6;

FIG. 25 is a diagram showing the shortest processing times estimated at parallel levels 1 to 3 for each node (suite) of the series-parallel nested tree in FIG. 6;

FIG. 29 is a diagram showing a pseudo program for the operation algorithm of the execution time evaluation process in FIG. 28;

FIG. 32 is a diagram showing a pseudo program for the operation algorithm of the execution time evaluation process in FIG. 31;

FIG. 36 is a diagram showing a pseudo program for the operation algorithm of the execution time evaluation process in FIG. 35;

FIG. 37 is a diagram showing the shortest processing times estimated by the second method at parallel levels 1 to 6 for each node (suite) of the series-parallel nested tree in FIG. 6;

FIG. 38 is a diagram showing the shortest processing times estimated in the same manner when the critical path length of the basic block is ignored;

FIG. 40 is a diagram for explaining the fact that the execution time for a parallel suite can be represented using parameter (d,w) of components;

FIG. 41 is a diagram showing an example parallel suite of basic block models.

DETAILED DESCRIPTION OF PREFERRED EMBODIMENTS OF THE INVENTION

Figure 1:
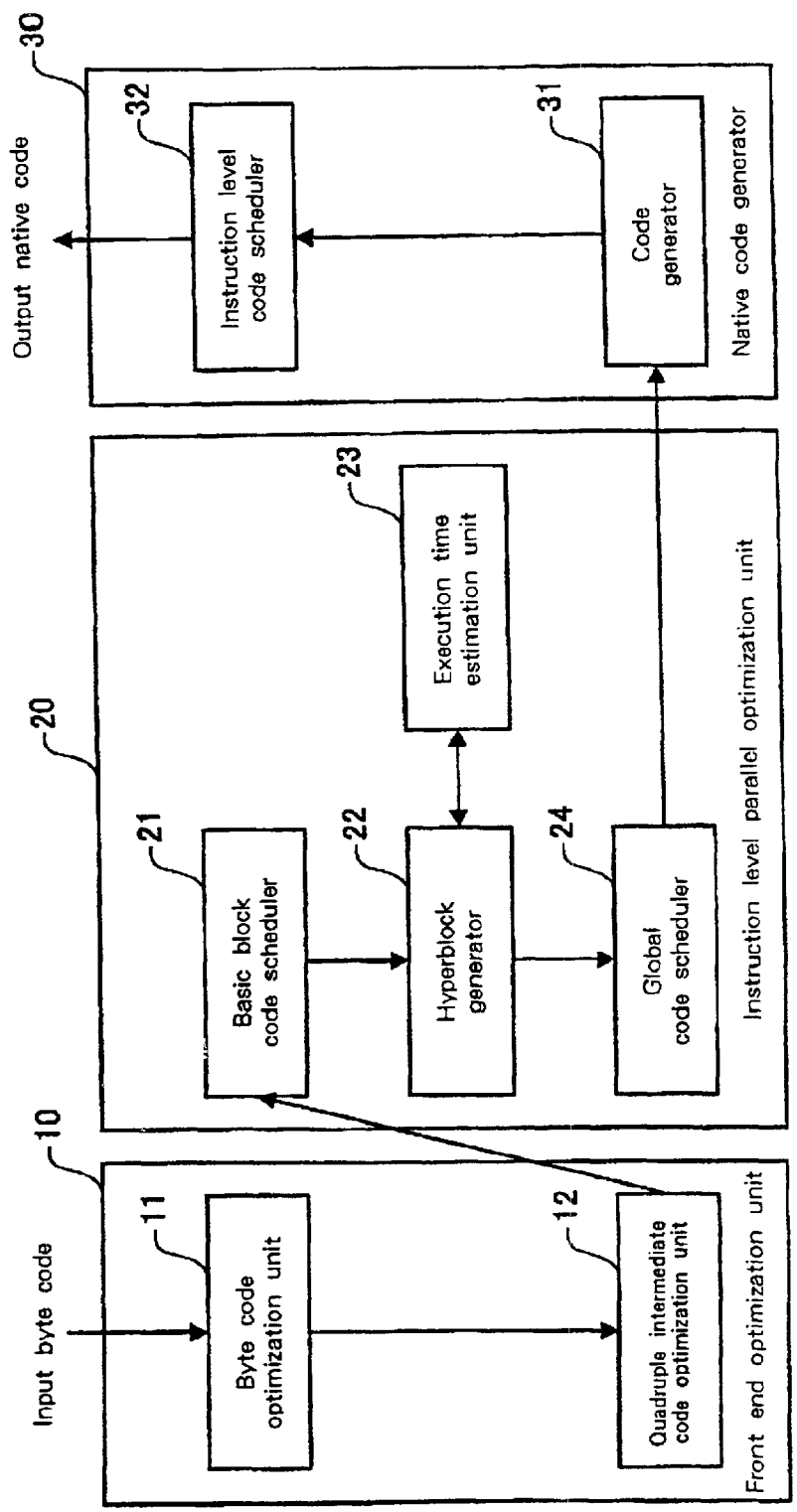
FIG. 1 is a diagram for explaining the configuration of a compiler according to an embodiment of the present invention.

Referring now to the drawings, first and second preferred embodiments of the invention will now be described in detail while referring to FIGS. 1–42.

As described above, in the present invention for optimization to be performed during the compilation of a program, a predetermined area in the program is appropriately divided into hyperblocks.

Specifically, first, a target program is divided into basic blocks that are defined as deformable, and a Program Dependence Graph (PDG) is prepared based on the control dependency and the data dependency existing among the basic blocks. The basic blocks are those representing the range of the straight code (e.g., a code queue that the control flow neither enters nor exits in the middle of the processing). In this invention, as will be described later, a basic block is defined as deformable within a range where the basic block is not smaller than the critical path length of the instruction queue that forms the basic block.

The obtained PDG is then converted into a series parallel graph, and the series parallel graph is used as a graph for the preceding limitation existing among the basic blocks. Thereafter, code scheduling is performed for the basic block in the series parallel graph, and optimization, such as a speculative instruction shift that exceeds the memory dependence, is performed.

Next, information, such as the critical path length, the average parallel level and a hardware resource to be consumed, are obtained for each of the basic blocks in the series parallel graph, and based on these data values, the shortest overall processing time for the area of the basic blocks is recurrently estimated. When it is ascertained during this processing that the processing speed for the sequential execution of a predetermined area is higher than that for the parallel execution, the segments included in the area are defined as independent hyperblocks, and an IF conversion is performed for all the conditional branching instructions of each hyperblock.

By using the dynamic planning method, this processing can be terminated within a calculated time that is proportional to the number of basic blocks.

Thus, the present invention provides a structure and method for quickly and appropriately dividing a program into hyperblocks and increasing the execution efficiency of the program.

Embodiment 1

As shown in FIG. 1, the compiler is a Just-In-Time Compiler for Java®. In this embodiment, an example is provided in which the present invention is applied to the Just-In-Time Compiler. However, the invention can also be applied to compilers for programs written in various other programming languages.

In FIG. 1, the compiler of the first embodiment includes a front end optimization unit 10, an instruction level parallel optimization unit 20, and a native code generator 30.

The front end optimization unit 10 includes a byte code optimization unit 11, for receiving the byte code for the JAVA program and for optimizing the program at the byte code level, and a quadruple intermediate code optimization unit 12, for optimizing, at the quadruple intermediate code level, the byte codes (e.g., quadruple intermediate byte codes) obtained by the byte code optimization unit 11. The quadruple intermediate code optimization unit 12 divides the target program into basic blocks.

The instruction level parallel optimization unit 20 includes a basic block code scheduler 21, for performing code scheduling for the basic blocks of the program that have been optimized at the quadruple intermediate code level by the front end optimization unit 10. The instruction level parallel optimization unit 20 further includes a hyperblock generator 22 and an execution time estimation unit 23 for preparing the PDG based on the dependency existing between the basic blocks and for appropriately dividing the PDG into hyperblocks. The instruction level parallel optimization unit 20 also includes a global code scheduler 24, for performing overall code scheduling for the program that has been divided into hyperblocks.

The native code generator 30 includes: a code generator 31, for converting, into native code, the program obtained by the instruction level parallel optimization unit 20; and an instruction level code scheduler 32, for performing code scheduling at the instruction level for the native code obtained by the code generator 31.

With this arrangement, the front end optimization unit 10 and the native code generator 30 are the same as those of the conventional Just-In-Time Compiler. Therefore, as the feature of this embodiment, the instruction level parallel optimization unit 20 performs code scheduling for the basic blocks, while the hyperblock generator 22 and the execution time estimation unit 23 generate hyperblocks, as they estimate the execution time for the instruction queue, and perform the overall code scheduling.

Further, not only the Just-In-Time Compiler in FIG. 1, but also a compiler for another programming language can perform context analysis for a received source program and generate an intermediate code, and can employ a functional block corresponding to the instruction level parallel optimization unit 20 in FIG. 1 to perform the optimization using the same parallelism at the instruction level.

The components in FIG. 1 are virtual software blocks implemented by the CPU that is controlled by the computer program. The computer program for controlling the CPU is stored on a storage medium, such as a CD-ROM or a floppy disk, or is provided by being transmitted via a network.

The operation of the instruction level parallel optimization unit 20 shown in FIG. 1 will now be explained. In this embodiment, the Program Dependence Graph (PDG) that represents the control dependency and the data dependencies existing among the instructions of the program is converted into a series parallel graph. Further, the estimate of the execution time for the instruction queue is recurrently performed and hyperblocks are appropriately generated.

Hereinafter, first, an explanation will be given for an overview for the operation of the instruction level parallel optimization unit 20, and then an explanation will be given for a specific method.

Figure 39:
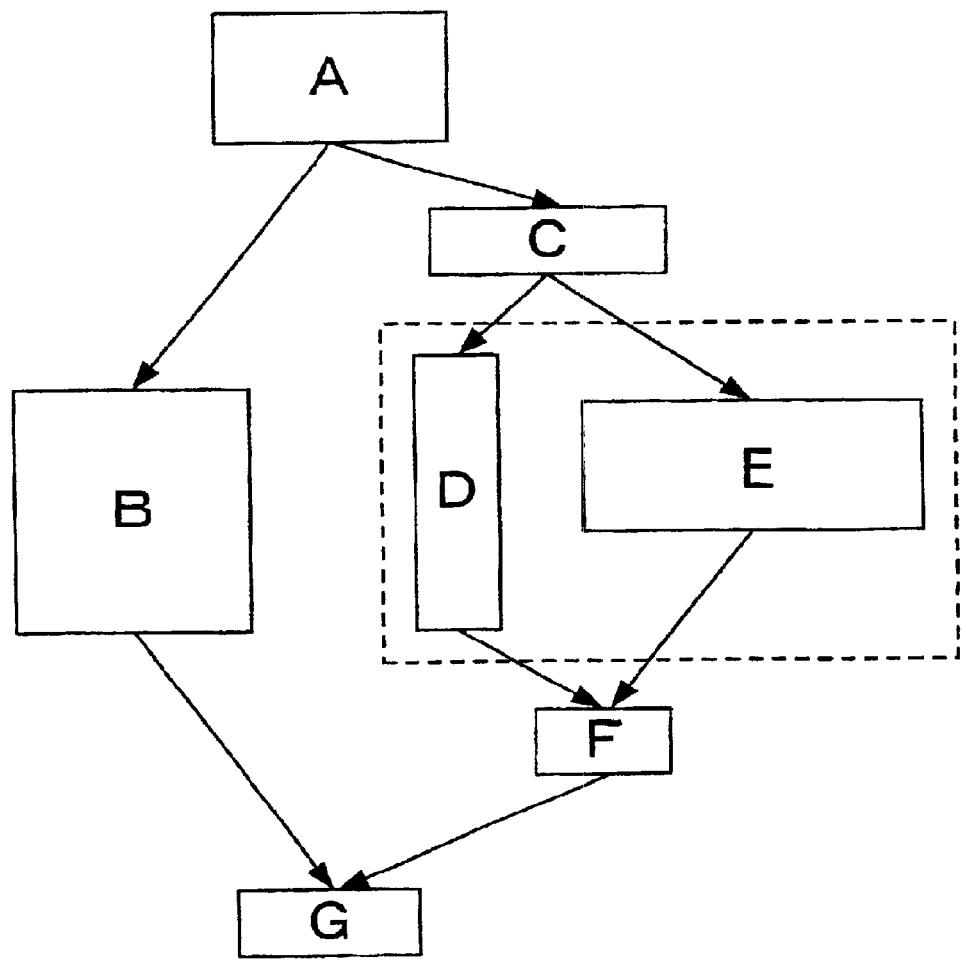
FIG. 39 is a diagram showing the structure of a target program using basic blocks.
Figure 42:
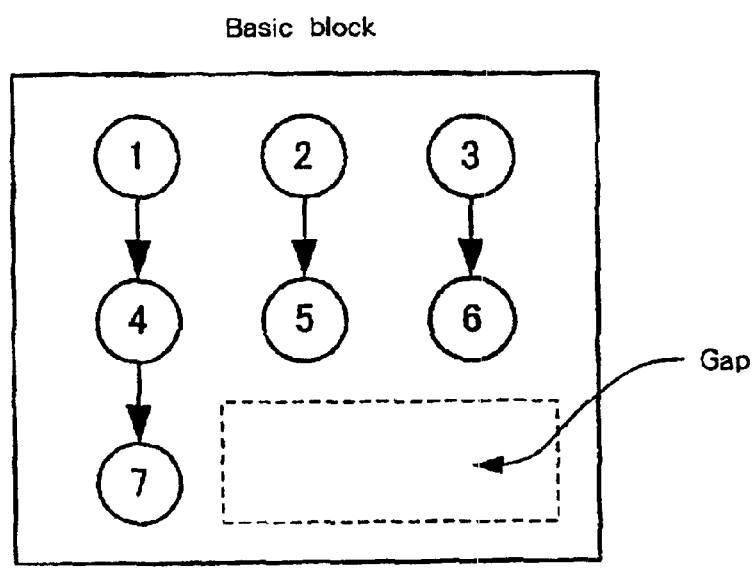
FIG. 42 is a diagram for explaining a gap formed in a basic block.

First, the basic block used for this embodiment will be described in detail. Referring to FIG. 39, a diagram is shown as an example where the structure of the program is expressed by using basic blocks.

For a pair of basic blocks (e.g., called a parallel suite, a definition of which will be given later), such as basic blocks D and E in FIG. 39, that do not depend on each other, the correct execution of the program is ensured, regardless of whether the operation for the parallel suite is performed in parallel or is performed sequentially. Thus, whether a parallel execution or a sequential execution should be performed is determined in order to obtain results that overall are satisfactory for the area.

To perform this determination simply, the overall processing time and necessary parallel level are obtained for all the available combinations, when all of the parallel suites in the area are executed either sequentially or in parallel, and are compared. Then, to obtain the overall processing time and the necessary parallel level, the execution of the parallel suite can be represented by the total d of the execution times for the components and the maximum parallel level value w.

FIG. 40 is a diagram that explains that the execution time for the parallel suite can be represented by using the parameters (d,w) of the component.

However, this method has three problems. First, as is described above, the basic block is the one representing the range of the straight code (e.g., the code queue that the control flow neither enters nor exits in the middle of the processing). Therefore, the basic block is not originally a non-deformable rectangular area, but is actually a set of instructions that can be flexibly moved (under a specific restriction). This, however, is not considered in the definition given for the basic block.

Secondly, as "a gap" shown in FIG. 40 is formed to prepare the suite, the accuracy attained when estimating the processing time and the parallel level is low.

Lastly, since the execution time is estimated using a method whereby all possible combinations in an area are employed for a case wherein the execution of a parallel suite is performed in parallel and for a case wherein the execution of the parallel suite is performed sequentially, calculation time increases exponentially in consonance with the number of basic blocks.

In this embodiment, therefore, a model for each basic block is obtained so that a basic block can be vertically extended (e.g., in the direction in which the processing time is extended) with the assumption that the height of each basic block should not be less than the critical path length.

An example parallel suite of basic block models is shown in FIG. 41. As is shown in FIG. 41, with the parallel suite, the processing time and the average parallel level can be estimated by deforming basic blocks D and E. Thus, an estimate that better conforms to the actual structure of the program can be obtained.

Further, since the basic blocks are deformable, the "gap" in the suite can be removed. In addition, since the average parallel level, which is the horizontal width of the basic block, is obtained using a simple model based on the total execution time and the critical path length of the instruction queue in the basic block, it is anticipated that the gap in the basic block shown in FIG. 42 can also be offset to a degree by employing multiple basic blocks.

An explanation will now be given for how to estimate the shortest processing time according to this model using the dynamic planning method, so that a fast estimate can be performed while an exponential increase in the calculation time in consonance with the number of basic blocks is avoided.

In this embodiment, for a predetermined area the estimate of the shortest processing time is recurrently performed beginning with the estimate of the shortest processing time for the area segment in the pertinent area. For example, the estimated processing times for basic blocks D and E in FIG. 39 are employed to estimate the execution time for a parallel suite that is formed using these basic blocks. Since one step of the recurrent process can be quickly performed, overall, implementation of a fast process is possible.

To perform this processing, not only the basic blocks, but also the parallel suite and a set of basic blocks that depend on each other (e.g., a series suite), must be regarded as deformable rectangular areas. In order to satisfy this assumption, the estimate data for the shortest processing time is recurrently calculated for the parallel levels w (1#w #W) of the basic block, the parallel suite and the series suite that are relative to the hardware parallel level W.

The method used to estimate the data for the shortest processing time will be briefly explained for the basic block, the parallel suite and the series suite.

For the basic block, the basic block code scheduler 21 performs the code scheduling and obtains the total execution time. The total execution time is divided by the parallel level w, and the obtained value is determined to be the estimated shortest processing time for the basic block. It should be noted that, according to the definition of the basic block in this embodiment, the obtained value is not smaller than the critical path length.

For the series suite, the processing time at the parallel level w of the component is simply added. For the parallel suite, as shown in FIG. 40, while the condition w1+w2=w is maintained, w1 is changed relative to the parallel level w (1 #w#W), and the maximum value for the execution time is obtained for each of the components when parallel processing is performed. The minimum value obtained for the maximum values is regarded as the estimated shortest processing time for the parallel suite.

This processing (e.g., one recurrent step) is terminated at most within a calculation time proportional to $W^2/2$. That is the entire processing is terminated within a calculation time proportional to $nW^2$, where n denotes the number of basic blocks.

A specific operation of the instruction level parallel optimization unit 20 is explained in detail with reference to the first exemplary embodiment. In this non-limiting embodiment, two methods for generating hyperblocks using the above dynamic planing method may be used. The first method uses an arrangement consisting of the basic block and the second method gives consideration to the dependency of the instructions in the basic block.

According to the first method, a basic block is formed as a model rectangular area that is represented by an average of the theoretical parallel levels and the critical path length. An assumption is that the estimated sequential execution times for multiple basic blocks are not less than the sum of the processing times for the critical paths. A further assumption is that the parallel level required, When multiple basic blocks are executed in parallel, approximates the linear sum of the average parallel levels of the basic blocks.

According to the second method for generating hyperblocks using the above dynamic planing method, not only is the basic block formed as a model rectangular area that is represented by the average of the theoretical parallel levels and the critical path length, but also information is provided concerning the dependency (e.g., dependence path) existing between the instructions for the basic block.

An assumption is that when the dependence path is re-established and the critical path length is re-calculated, the estimated sequential execution times for multiple basic blocks will not be smaller than the obtained critical path length. The parallel level required when multiple basic blocks are executed in parallel is handled in the same manner as in the first method.

Since the basic block that is formed approximates the rectangular area that is represented by the average parallel level and the critical path length, the parallel level required when multiple basic blocks are performed in parallel can approximate the linear sum of the average parallel levels of the basic blocks. As a result, fast processing can be implemented.

The first and the second methods are described in detail below with the definitions for the symbols used in the following explanation shown in FIG. 7. In FIG. 7, the definition "node" denotes a general node. Therefore, in the following explanation, instead of "node", "child1" may be written for a child node of a specific node.

Method 1

The instruction level parallel optimization unit 20 initially receives a program (e.g., intermediate code) that has been optimized by the front end optimization unit 10 that functions as a pre-process, and employs the execution frequency information and the structure of the program to determine an area for parallel execution.

Figure 2:
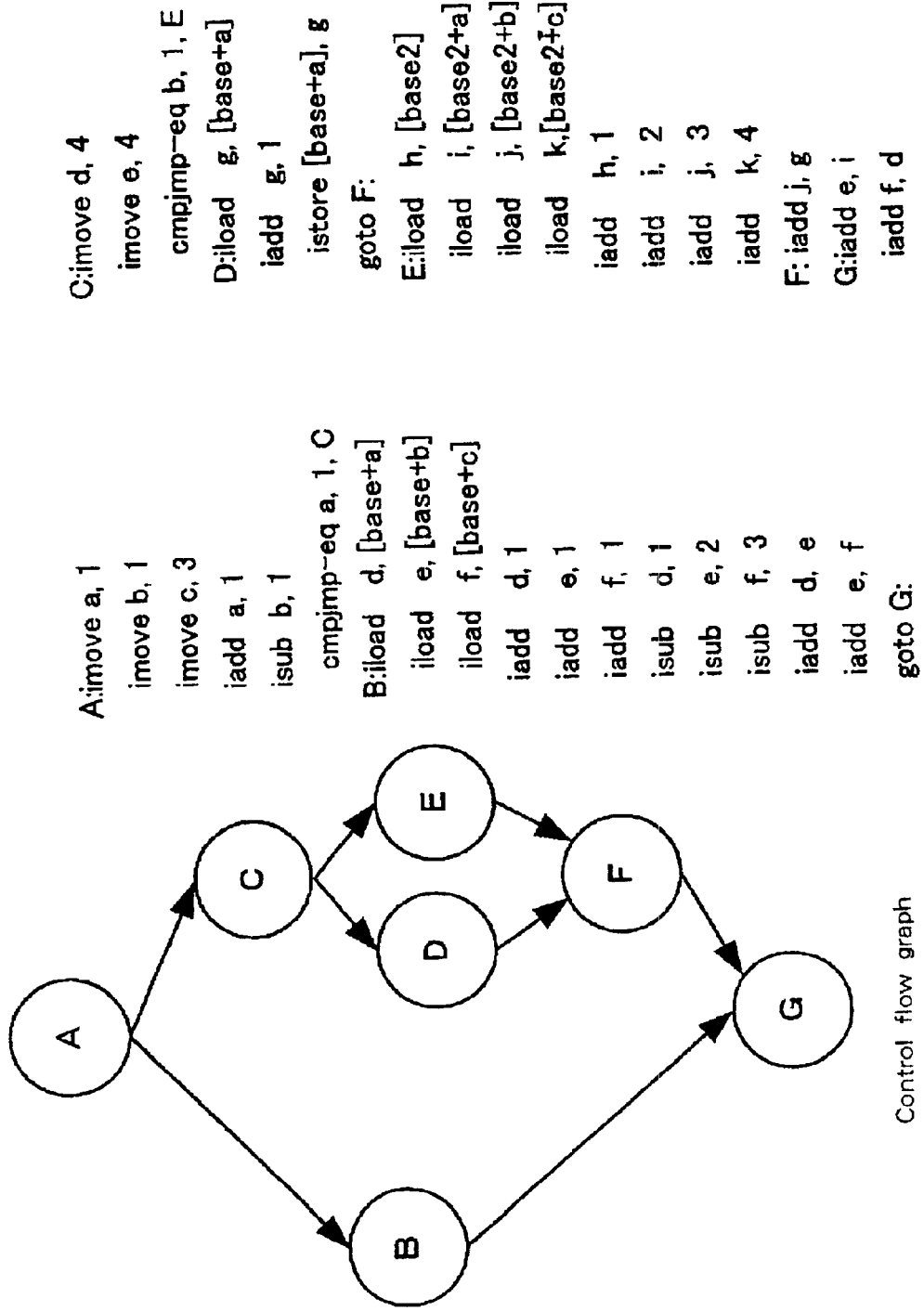
FIG. 2 is a control flow graph showing the area of a target program to be optimized and the list of instruction queues for the pertinent area.

The execution area can be, for example, an area for which the execution frequency is equal to or higher than a specific level, and in which a loop is not included. In this embodiment, the program area shown in FIG. 2 is a processing target. FIG. 2 consists of a control flow graph for an area for the optimization of the target program, and a list of instruction queues for the pertinent area.

The basic block code scheduler 21 performs, for each basic block in the pertinent area, code scheduling that is accompanied by the removal of an ambiguous memory dependency. Thus, a node.cl and a node.all can be estimated for each basic block (e.g., "node" in FIG. 7).

Figure 3:
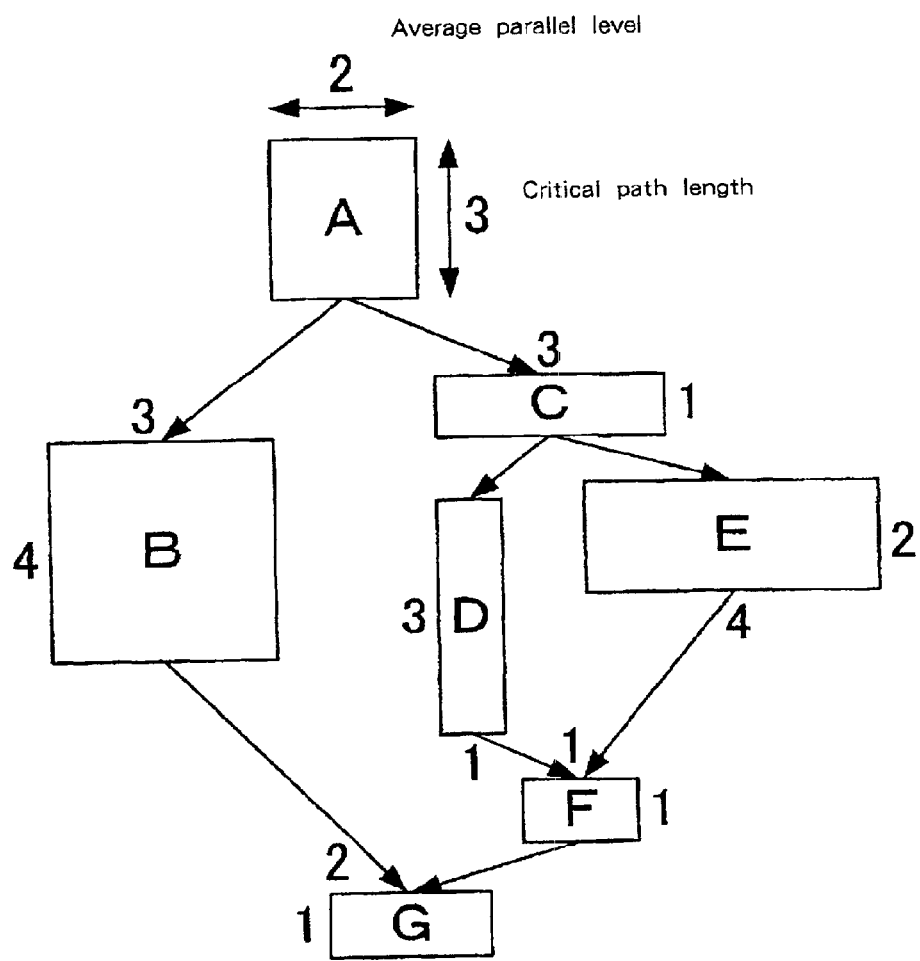
FIG. 3 is a diagram showing the program area in FIG. 2 where basic blocks are represented by using rectangles having node.cl as the height and node.all as the dimension.

As shown in FIG. 3, a diagram similar to the program area in FIG. 2, has basic blocks that are represented as rectangular areas that have "node.cl" as the height and "node.all" as the dimension. The width of a basic block, i.e., the value obtained by dividing the dimension (node.all) by the height (node.cl), is called the average parallel level. In FIG. 2, for example, node A includes six instructions "imove a, 1", "imove b, 1", "imove c, 3", "iadd a, 1", "isub b, 1" and "cmpjmp-eq a, 1, C". Since dependence paths are established that connect "imove a, 1", "iadd a, 1" and "cmpjmp-eq a, 1, C", these instructions can not be executed in parallel, and thus, since of the six instructions three are sequentially executed, these three serve as the critical path length. Therefore, as is shown in FIG. 3, node A is represented by a rectangle having a height of 3 and a width of 2 (e.g.,=6/3).

Next, the hyperblock generator 22 prepares the PDG that shows the control dependence paths and the data dependence paths connecting the basic blocks in FIG. 3. The redundant branches are removed from the PDG to form the preceding limitation graph, which is then transformed into a series/parallel graph. A series/parallel graph is a graph that satisfies three conditions. First, a single node is a series/parallel graph. Second, a connection in series of two series/parallel graphs is a series/parallel graph. Finally, the connection in parallel of two series/parallel graphs is a series/parallel graph.

The structure of a series/parallel graph can be divided two portions including a series suite and a parallel suite. The series suite portion is a sequence consisting of a series suite, a parallel suite and a node that are connected in series (e.g., a connection is called a series connection) and that depend on each other. The parallel suite portion is a set consisting of a series suite, a parallel suite and a node that are connected in parallel (e.g., a connection is called a parallel connection) and that do not depend on each other.

FIG. 8 is a diagram showing a pseudo program for an algorithm for transforming a PDG into a series-parallel graph. The procedures of the algorithm in FIG. 8 are completed in a calculation time proportional to the number of nodes in the PDG.

Figure 4:
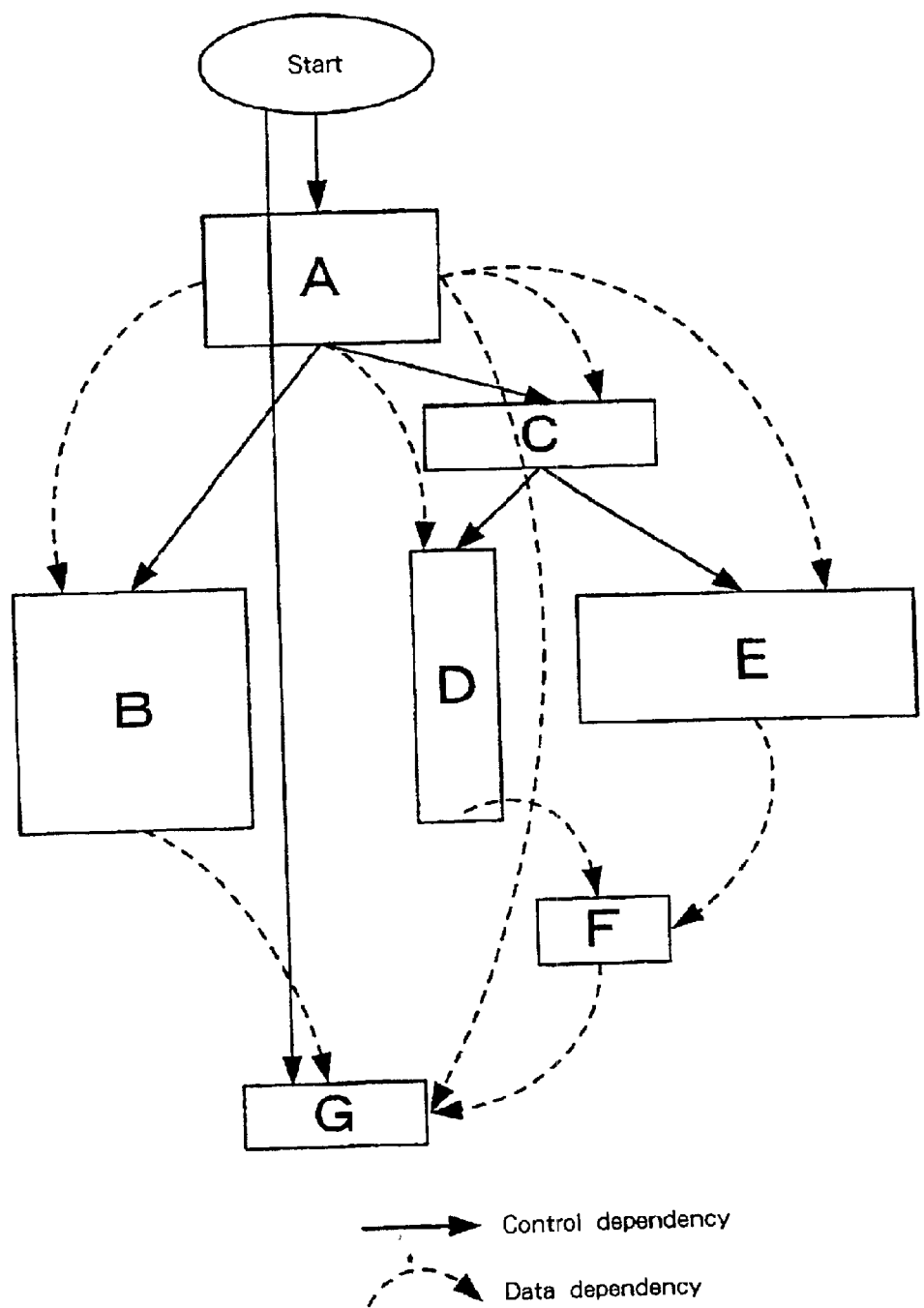
FIG. 4 is a diagram showing a Program Dependence Graph (PDG) prepared using the basic blocks in FIG. 3.
Figure 5:
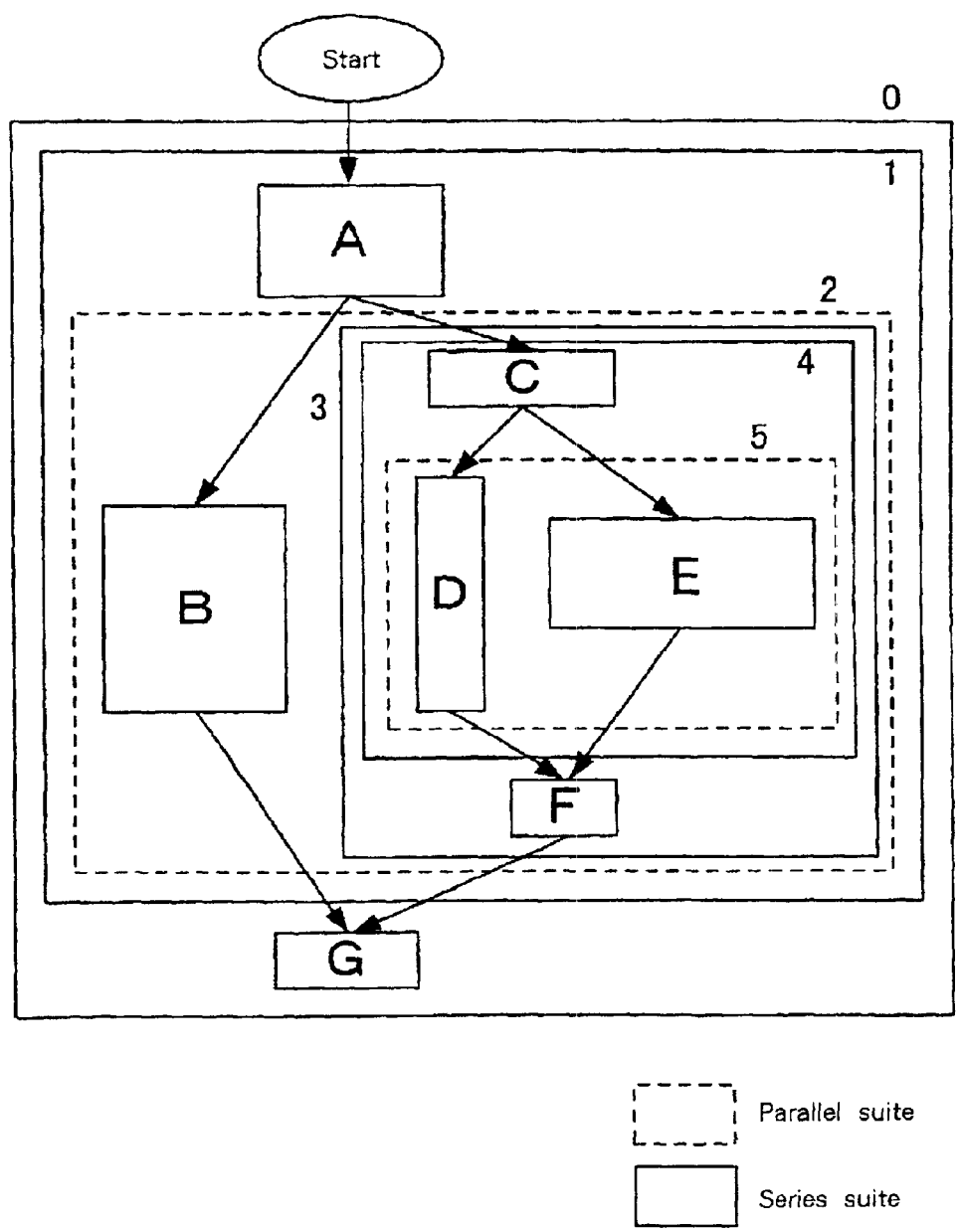
FIG. 5 is a diagram showing a series-parallel graph obtained by transforming the PDG in FIG. 4.

Referring to FIGS. 4 and 5, a diagram of a PDG prepared from the PDG in FIG. 3 is shown and a diagram of a series/parallel graph obtained by transforming the PDG in FIG. 4. As shown in FIGS. 4 and 5, for example, the data dependence path from node A to node D in FIG. 4 is regarded as redundant and removed (e.g., as shown in FIG. 5) because dependence paths are established that lead from node A to node C and from node C to node D.

Following this, the hyperblock generator 22 generates, with reference to the series/parallel graph above, a series/parallel nested tree that represents the nesting relationship existing between the series suite and the parallel suite. The series/parallel nested tree is a tree structure having nodes and edges that are defined as follows:
- node: a set of all the series suites, all the parallel suites or all the nodes in the series/parallel graph.
- edge: an edge is extended from a predetermined series suite to a sequence consisting of suites or of nodes when a sequence of series suites, parallel suites or nodes coupled only in a series connection is present relative to a predetermined series suite; or
an edge is extended from a predetermined parallel suite to a sequence consisting of suites or of nodes when a sequence of series suites, parallel suites or nodes coupled only in a parallel connection is present relative to a predetermined parallel suite.

FIG. 9 is a diagram showing a pseudo program for an algorithm for generating a series-parallel nested tree using a series-parallel graph. The procedures of the algorithm in FIG. 9 are completed in a calculation time proportional to the number of nodes in the series-parallel graph. The algorithm in FIG. 9 permits the parallel suite to consist of three or more leaf nodes although this can be easily changed to have only two leaf nodes.

Figure 6:
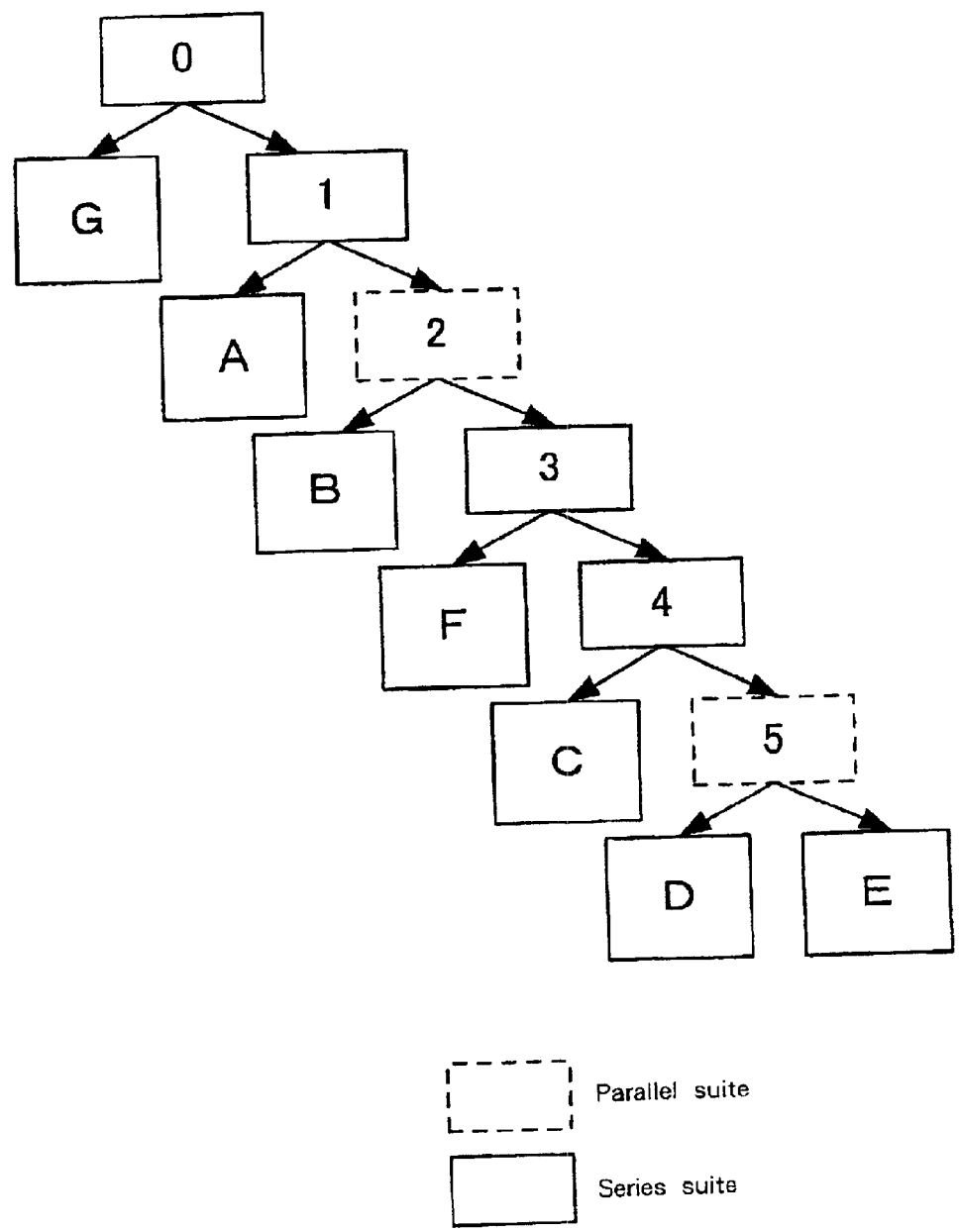
FIG. 6 is a diagram showing a series-parallel nested tree generated using the series-parallel graph in FIG. 5.

FIG. 6 is a diagram showing a series/parallel nested tree generated from the series/parallel graph in FIG. 5. The nodes described by the solid lines in FIGS. 5 and 6 are series suites and the nodes described by broken lines are parallel suites.

The hyperblock generator 22 permits the execution time estimation unit 23 to recurrently estimate the execution time for each node in the series/parallel nested tree. The hyperblock generator 22 performs the hyperblock selection process based on the estimated execution time (e.g., see FIG. 10). Through the hyperblock selection process, information as to whether anode should be regarded as an independent hyperblock is attached to each node of the series/parallel nested tree.

The hyperblock selection process will now be described in detail referring to FIG. 11, a flowchart showing the processing performed during the hyperblock selection process, and to FIG. 12, a diagram showing a pseudo program that represents the algorithm used for the operation in FIG. 11.

Figure 11:
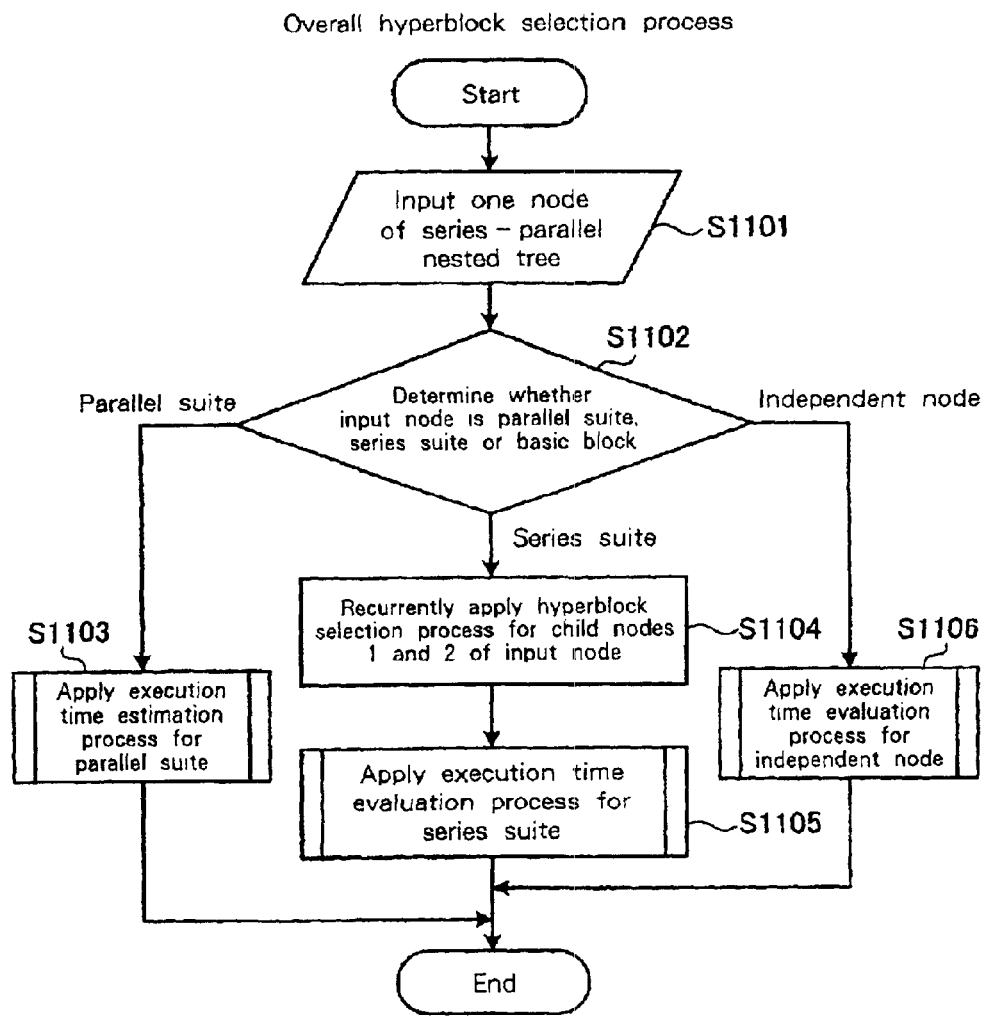
FIG. 11 is a flowchart showing the overall hyperblock selection process.

In FIG. 11, first, one of the nodes in the series/parallel nested tree is selected as a processing target (step 1101). The attribute of the node is then examined to determine whether the node is a parallel suite, a series suite or a basic block (e.g., independent node as in step 1102).

If the node is a parallel suite, program control is shifted to the execution time estimation unit 23 to prepare an estimated execution time for the parallel suite (e.g., step 1103). If the node is a series suite, the hyperblock selection process is recurrently employed for the child nodes (e.g., child nodes 1 and 2 in this case) of the node (e.g., step 1104), and the execution time for the series suite is evaluated (e.g., step 1105). If the node is a basic block (e.g., independent node), the execution time for the independent node is evaluated (e.g., step 1106).

At step 1103, the execution time estimation process is performed for the parallel suite. This is done to obtain the processing time for a predetermined parallel suite (x) at the parallel level W for suite (y, z), consisting of parallel suite (x), w1 is changed while the value W=w1+w2 is maintained, and the maximum values at the parallel levels w1 and w2 are obtained respectively for the shortest processing time for suite (y) and the shortest processing time for suite (z). A minimum value, selected from among the maximum values obtained for the individual values of w1, is regarded as the estimated shortest processing time for parallel suite (x) at the parallel level W.

When the nodes of the parallel suite constitute one hyperblock, the processing time is extended. Thus, it can be determined whether the nodes in the parallel suite should be collected to form a hyperblock. Specifically, it can be determined whether the overhead required for parallel execution is less than the gain provided by reducing the branching instructions. When the nodes are not used to constitute a hyperblock, a mark is attached that conveys the meaning that the nodes have been separated to form another hyperblock (e.g., node.hyper_block=TRUE as shown in FIG. 7).

Then, a variety of methods can be employed to determine which suite should be an independent hyperblock. For example, a determination can simply be made as to whether the suite having the longer critical path should be an independent hyperblock or whether, when the execution probability is obtained in advance, the suite having a lower execution probability should be a hyperblock.

Figure 13:
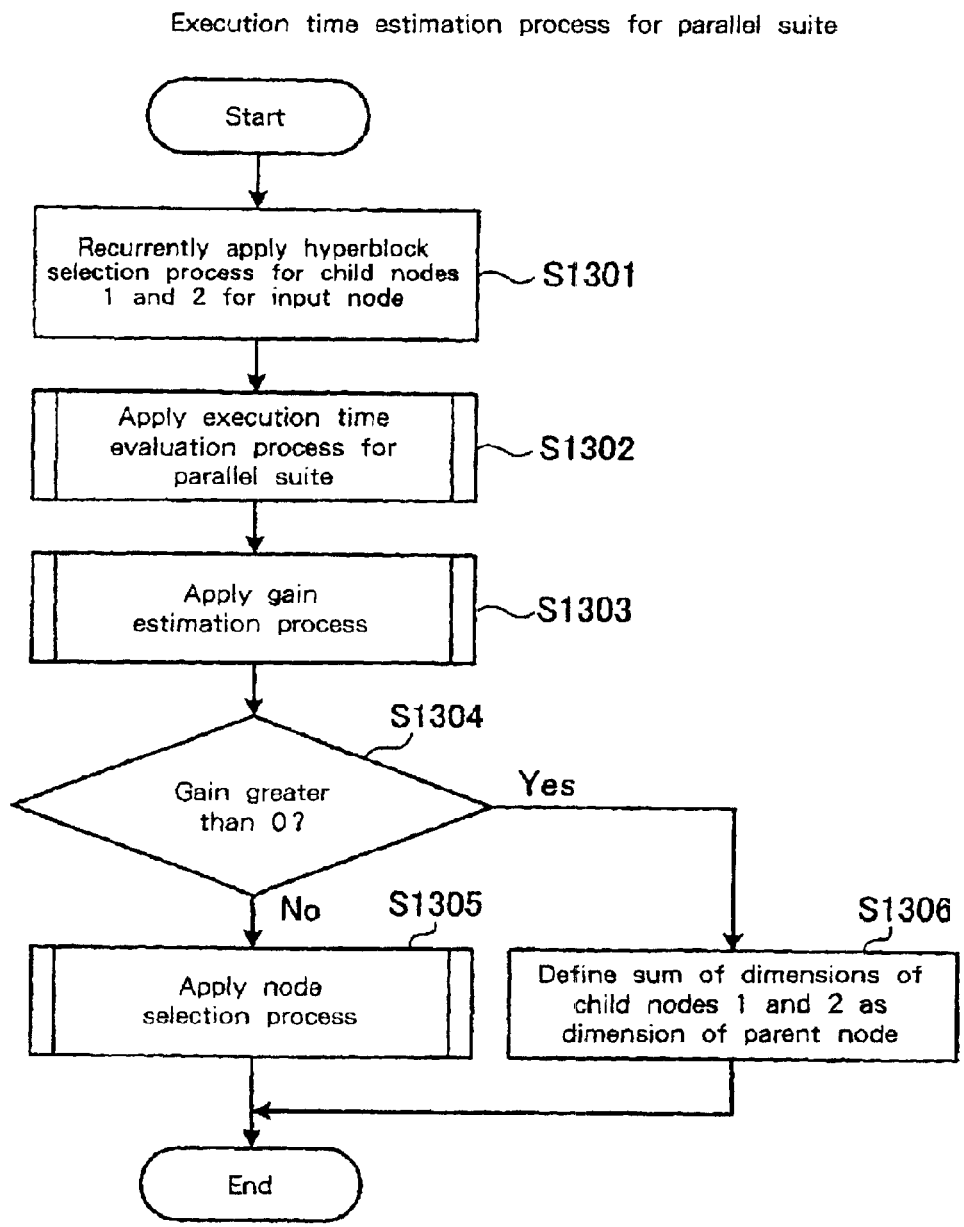
FIG. 13 is a flowchart for explaining the execution time estimation process for a parallel suite.

FIG. 13 is a flowchart for explaining step 1103 in FIG. 11 for the execution time estimation process employed for a parallel suite. In FIG. 13, first, the hyperblock selection process is recurrently performed for the child nodes (e.g., child nodes 1 and 2) of the target node (e.g., step 1301). After the execution time evaluation process (e.g., step 1302) and the gain estimation process (e.g., step 1303) have been performed for the parallel suite, a check is performed to determine whether the obtained gain is greater than 0 (e.g., step 1304). If the gain is equal to or less than 0, the node selection process is performed (e.g., step 1305). If the gain is greater than 0, the sum of the dimensions of the child nodes 1 and 2 (e.g., node.all: the total execution time for the pertinent node) is defined as the dimension for the parent node (e.g., the node that is first selected as a processing target in step 1306).

Figure 14:
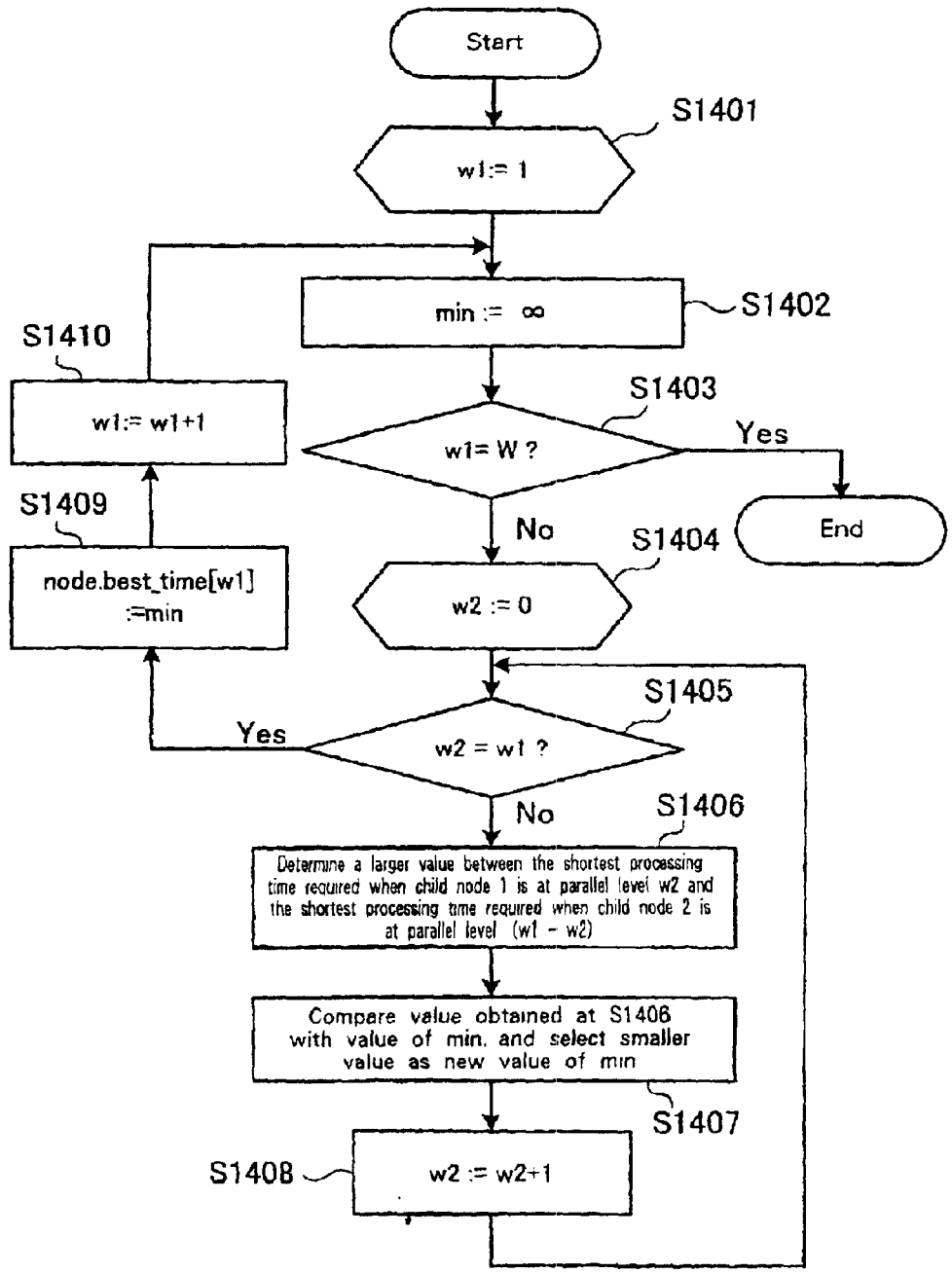
FIG. 14 is a flowchart for explaining the execution time evaluation process.

FIG. 14 is a flowchart for explaining step 1302 in FIG. 13 for the execution time evaluation process, and FIG. 15 is a diagram showing a pseudo program for the operation algorithm used for the execution time estimation process in FIG. 14. In FIG. 14, first, effective only for this process, the value of a free variable w1 is initialized to 1 (e.g., step 1401). Then, also effective only in this process, the value of a free variable min is initialized to infinite (e.g., step 1402). The variable w1 and the parallel level W of the hardware are then compared to determine whether they match (e.g., step 1403). When the variable w1 does not match the parallel level W, effective only in this process, a free variable w2 is initialized to 0 (e.g., step 1404) and the variable w2 is compared with the variable w1 to determine whether they match (e.g., step 1405).

When the variables w1 and w2 do not match, the shortest processing time obtained when the child node 1 is at the parallel level w2 is compared with the shortest processing time obtained when child node 2 is at the parallel level (w1−w2) to determine which value is the larger (e.g., step 1406). The obtained value is then compared with the value of a variable min, and the smaller value is determined to be the new variable min (e.g., step 1407). Thereafter, the value of the variable w2 is incremented by one (e.g., step 1408) and program control returns to step 1405 for the comparison.

When the variables w1 and w2 match, the current value held by the variable min is determined to be the shortest processing time when the parent node (e.g., the node that is first determined as the processing target) is at the parallel level w1 (e.g., step 1409). Thereafter, the value of the variable w1 is incremented by one (e.g., step 1410) and program control returns to step 1402.

When the variables w1 and w2 match (e.g., at step 1403) the processing is terminated.

Through this processing, the estimated shortest processing time can be obtained for the parallel suite at the parallel level W. Since the actual parallel level W of the CPU (e.g., hardware) is a small, single digit value, the execution time evaluation process can be terminated within a time in proportion to the number of nodes.

Figure 16:
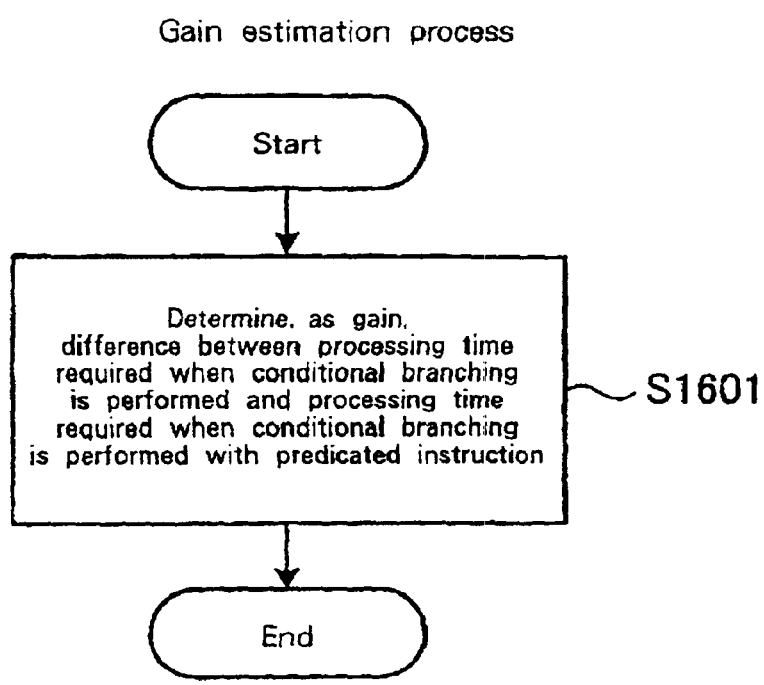
FIG. 16 is a flowchart for explaining the gain estimation process.

FIG. 16 is a flowchart for explaining step 1303 in FIG. 13 for the gain estimation process. FIG. 17 is a diagram showing a pseudo program for the operation algorithm of the gain estimation process in FIG. 16.

As shown in FIG. 16, based on the shortest estimated processing time for the parallel suite, which is prepared by the execution time evaluation process in FIGS. 14 and 15, gain is obtained as a difference between the time required when, as conditional branches, the processing for the child nodes 1 and 2 is performed and the processing time when the child nodes 1 and 2 are performed in parallel in accordance with the predicated instruction (e.g., step 1601).

Figure 18:
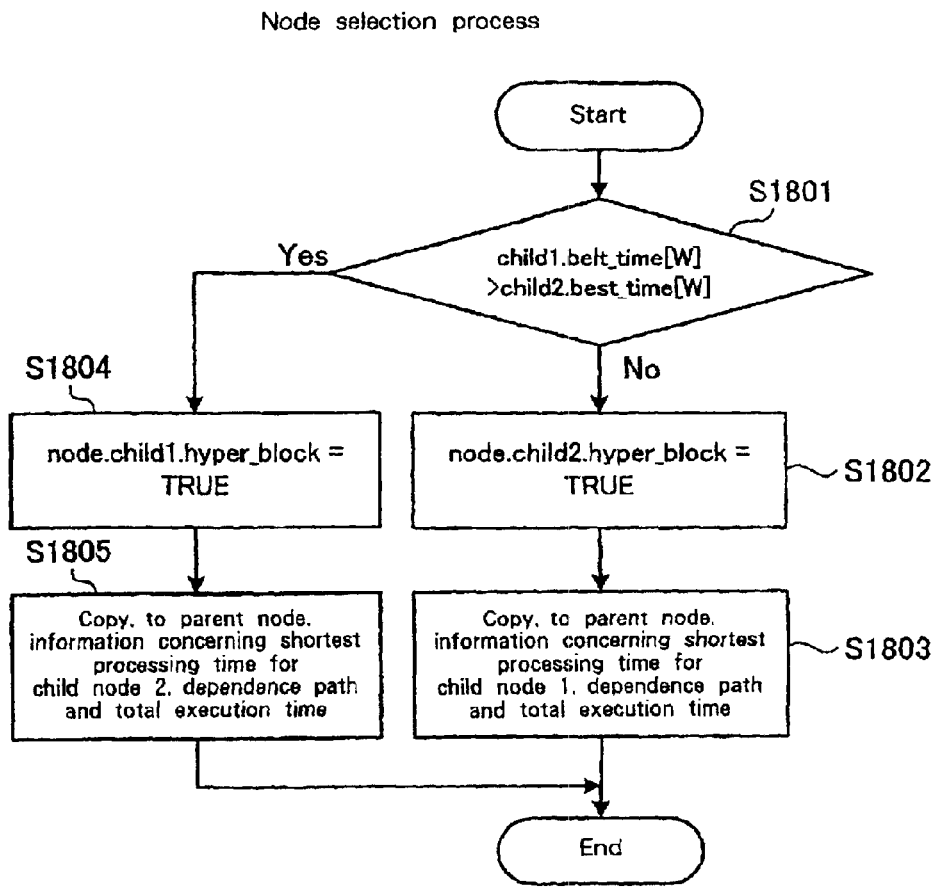
FIG. 18 is a flowchart for explaining the node selection process.

FIG. 18 is a flowchart for explaining step 1305 in FIG. 13 for the node selection process, and FIG. 19 is a diagram showing a pseudo program for the operation algorithm used for the node selection process in FIG. 18.

Referring to FIG. 18, first, the shortest processing time for the child node 1, at the parallel level W of the hardware, is compared with that of the child node 2 (e.g., step 1801). When the shortest processing time for the child node 1 is equal to or less than the shortest processing time for the child node 2, an attribute indicating that the child node 2 is regarded as an independent hyperblock is attached to the child node 2 (e.g., step 1802). Then, information for the shortest processing time for the child node 1, the dependency and the total execution time are copied to the parent node (e.g., the node that is first selected as a processing target in step 1803). As a result, the parent node is constituted only by the child node 1.

When, at step 1801, the shortest processing time for the child node 1 is longer than that for the child node 2, an attribute indicating that the child node 1 is regarded as an independent hyperblock is attached to the child node 1 (e.g., step 1804). Then, information for the shortest processing time for the child node 2, the dependency and the total execution time are copied to the parent node (e.g., the node that is first selected as a processing target in step 1805). As a result, the parent node is constituted only by the child node 2.

Thereafter, the execution time estimation process is terminated for the parallel suite in the series/parallel nested tree. Through this processing, information indicating that each node constituting the parallel suite should either be assembled into one hyperblock or branched to another hyperblock, and the estimated execution time for the one or two hyperblocks can be obtained. This information and estimate are provided for the hyperblocks.

At step 1105 shown in FIG. 11, for the execution time evaluation process for the series suite, the execution time for the series suite is roughly estimated by simply adding together the shortest processing times for the nodes that constitute the series suite. Further, the execution time is corrected so as to be the shortest relative to the average parallel level w.

Figure 20:
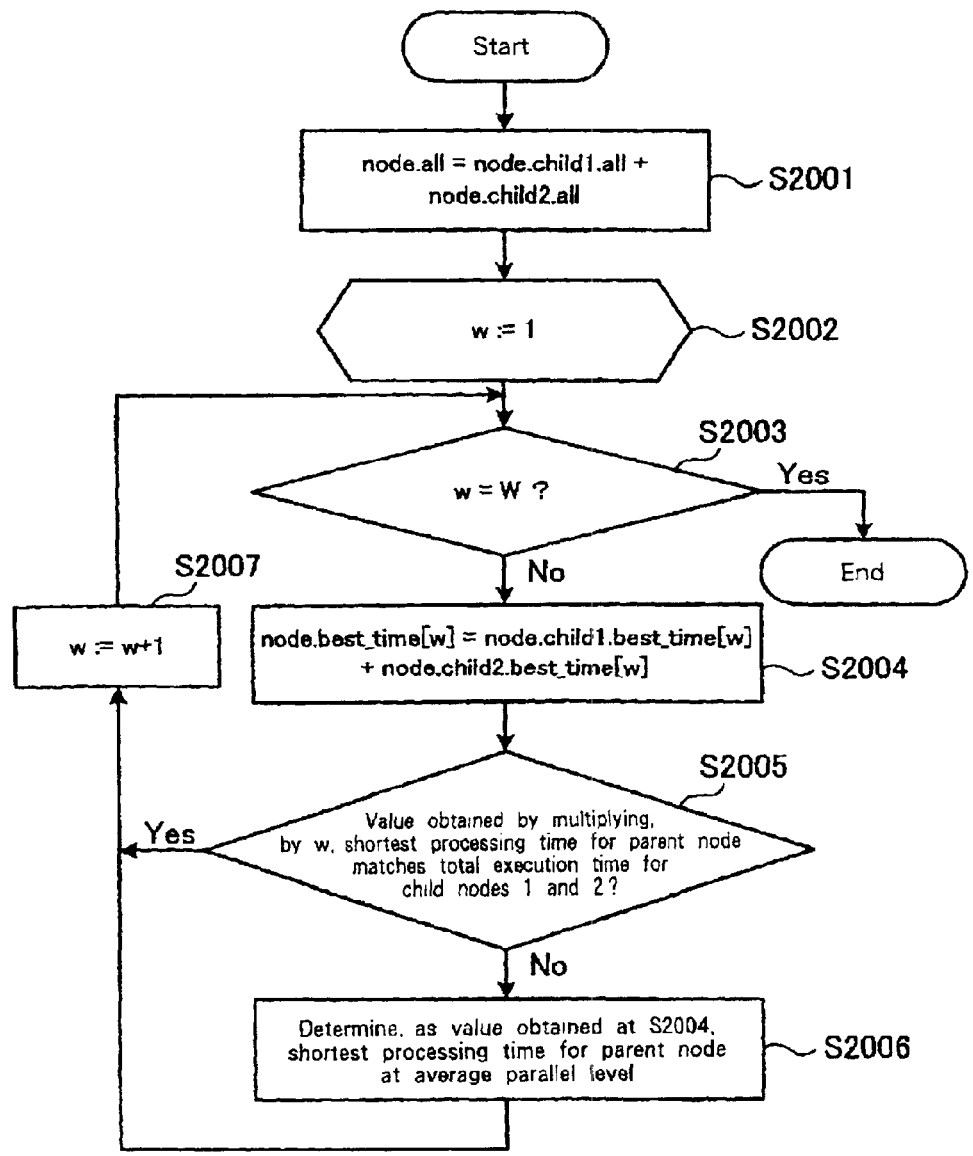
FIG. 20 is a flowchart for explaining the execution time estimation process for a series suite.

Referring to FIG. 20 there is shown a flowchart for explaining step 1105 in FIG. 11 for the execution time evaluation processing for the series suite, and referring to FIG. 21 there is shown a diagram of a pseudo program for the operation algorithm of the execution time evaluation process in FIG. 20.

In FIG. 20, first, the total execution time for the target node is defined as the sum of the total execution times for its child nodes (e.g., child nodes 1 and 2 in this case in step 2001). Then, effective only in this process, the value of a free variable w is initialized to 1 (e.g., step 2002). The variable w is then compared with the parallel level W of the hardware to determine whether the two match (e.g, step 2003).

If the variable w is not equal to the parallel level W, the shortest processing time for the target node at the parallel level w is defined as the sum of the shortest processing times for the child nodes 1 and 2 at the parallel level w (e.g., step 2004). Then, the shortest processing time for the target node is multiplied by the variable w, and the obtained value is compared with the total execution time for the child nodes 1 and 2 to determine whether the two match (e.g., step 2005). That is, a determination is made as to whether the variable w has reached the average parallel level of the target node.

When the value obtained by multiplying the shortest processing time for the target node by the variable w differs from the total execution time for the child nodes 1 and 2, the shortest processing time for the target node, relative to the average parallel level, is determined as a value obtained at step 2004 (e.g., step 2006).

When the value obtained by multiplying the shortest processing time for the target node by the variable w is equal to the total execution time for the child nodes 1 and 2, or after the processing at step 2006 is completed, the value of the variable w is incremented by one (e.g., step 2007) and program control returns to step 2003.

When the variable w matches the parallel level W at step 2003, the processing is terminated.

At step 1106 in FIG. 11 for the execution time evaluation processing performed for an independent node, it is estimated that the value obtained by dividing the total calculation amount by the parallel level can be employed, so long as that value is smaller than the critical path length.

Figure 22:
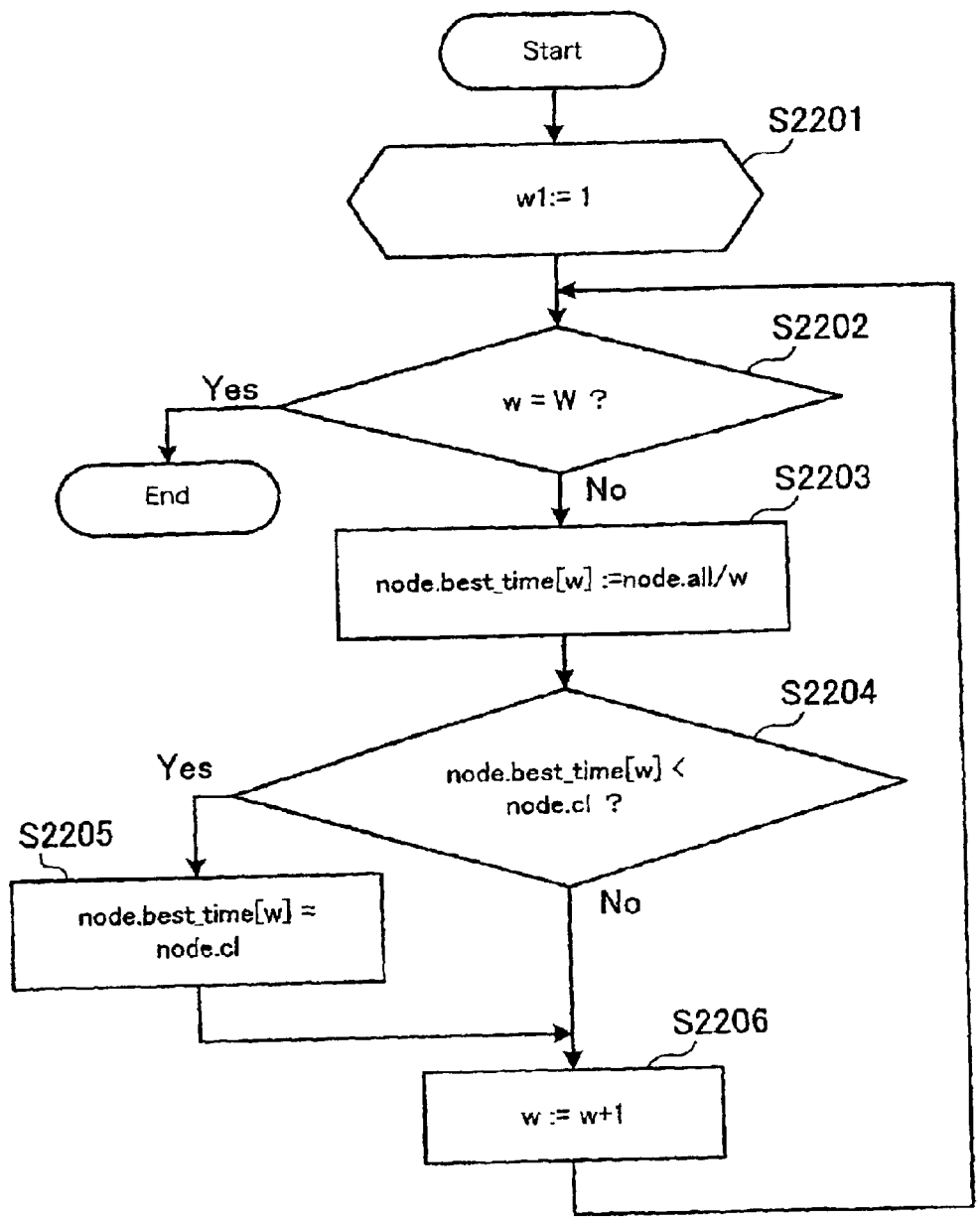
FIG. 22 is a flowchart for explaining the execution time evaluation process for an independent node.

Referring to FIG. 22, a flowchart is shown for explaining step 1106 in FIG. 11 for the execution time evaluation process performed for the independent node, and FIG. 23 is a diagram showing a pseudo program for the operation algorithm for the execution time evaluation process in FIG. 22.

In FIG. 22, first, effective only in this processing, the free variable w is initialized to 1 (e.g., step 2201). The variable w is then compared with the parallel level W of the hardware to determine whether they match (e.g., step 2202). When the variable w does not match the parallel level W, the value obtained by dividing the total execution time in the basic block by the variable w is defined as the shortest processing time for the target node (e.g., step 2203). Thereafter, a check is performed to determine whether the obtained value is smaller than the critical path length of the basic block (e.g., step 2204).

When the shortest processing time for the target node obtained at step 2203 is smaller than the critical path length of the basic block, the shortest processing time for the target node is defined as the critical path length of the basic block (e.g., step 2205).

When the shortest processing time for the target node obtained at step 2203 is not smaller than the critical path length of the basic block, or when the processing at step 2205 has been completed, the value of the variable w is incremented by one (e.g., step 2206) and program control returns to step 2202.

When the variable w and the parallel level W match at step 2202, the processing is terminated.

The estimation and the evaluation of the execution times of the parallel suite, the series suite and the independent node are recurrently performed from the root node to the leaf node of the series/parallel nested tree. As a result, an appropriate hyperblock can be generated. That is, if the execution times would be shorter after the nodes have been assembled into one hyperblock, these nodes are assembled into one hyperblock. Alternatively, if the total of the execution times would be shorter when the nodes are not assembled into one hyperblock, the nodes are separated and incorporated in different hyperblocks.

An explanation of an example where the first method is used to generate a hyperblock is provided below.

In this explanation, a case where a parallel level of the hardware is 6 and a case where the parallel level is 3 are used to demonstrate examples of a reduced execution time when the parallel process is performed and of a reduced execution time when conditional branching is performed. It is assumed that the programs shown in FIGS. 2 to 6 are employed and that the individual instructions are executed at a time 1. It is also assumed that a penalty (e.g., the processing time naturally required to perform the branching process) due to the branching process is 5.

First, in the case where the parallel level of the hardware is 6, an execution time for suite 5 of the series/parallel nested tree in FIG. 6 is estimated to be a parallel level W of 3. In this case, suite 5 is a parallel suite wherein basic blocks D and E are connected in parallel. Therefore, the execution time evaluation process in FIG. 14 is performed for the parallel suite, and the maximum time obtained from among the processing times are the parallel levels for basic blocks D and E.

In this case, when the parallel level W of suite 5 is 3, the parallel levels of basic blocks D and E can be either 2 and 1, or 1 and 2.

By referring to the information for the rectangle that represents basic block D in FIG. 3, the critical path length of basic block D is determined to be 3, and the average parallel level is determined to be 1 (e.g., indicating that the instructions can not be performed in parallel and must be performed sequentially). Thus, the time required for the processing of basic block D is 3, regardless of the parallel level.

Similarly, by referring to the information for the rectangle that represents basic block E in FIG. 3, the critical path length of basic block E is determined to be 2, and the average parallel level is determined to be 4. Thus, the time required for the processing of basic block E is 8 at the parallel level of 1, 4 at the parallel level of 2, 3 at the parallel level of 3, or 2 at a parallel level equal to or greater than 4.

Therefore, when the parallel level of basic block D is 2 and the parallel level of basic block E is 1, the execution time for basic block D is 3, and the execution time for basic block E is 8. When the parallel level of the basic block D is 1 and the parallel level of basic block E is 2, the execution time for basic block D is 3, and the execution time for basic block E is 4. That is, to perform parallel processing for basic blocks D and E, when the parallel level of basic block D is 2 and the parallel level of basic block E is 1, the execution time is 8, and when the parallel level of basic block D is 1 and the parallel level of basic block E is 2, the execution time is 4.

The shortest processing time for suite 5 can be estimated as 4.

FIG. 24 is a diagram showing the shortest processing times that are thus estimated, at the parallel levels 1 to 6, for the individual nodes (e.g., suites) of the series/parallel nested tree in FIG. 6.

In the execution time estimation process for suites 5 and 2, which are parallel suites of the series/parallel nested tree in FIG. 6, a check is performed to determine whether suites 5 and 2 should be assembled into one hyperblock or should be separated and incorporated into independent hyperblocks (e.g., see FIG. 13).

For example, the shortest processing time for suite 2 at the parallel level of 6 is determined to be 6 by referring to FIG. 24 (e.g., when the parallel level of basic block B is 2 and the parallel level of suite 3 is 4, or when the parallel levels of both basic block B and suite 3 are 3). Whereas, in the gain estimation process shown in FIGS. 16 and 17, the processing time when suite 3 and basic block 3 are executed using conditional branching is 9.5 (e.g., =5+(4+5)/2), because the shortest processing times for basic block B and for suite 3 are 4 and 5 at the parallel level 6. Therefore, since the processing time required when the conditional branching is performed is greater than the shortest processing time required for the parallel processing, the gain is greater than 0 (9.5−6=3.5>0). Thus, suite 2 is assembled into one hyperblock (e.g., see steps 1304 and 1306 in FIG. 13).

Since suite 2, together with basic blocks A and G, which are other nodes, constitutes the series suite, only the case at the maximum parallel level 6 needs to be considered. However, for suite 5, the gain must be estimated in accordance with the parallel level associated with suite 3, which constitutes suite 2. While, no explanation will be provided here as to how to avoid this complexity, the same calculation need only be performed for suite 5 at the individual parallel levels, so that in all cases the gain will be greater than 0.

Therefore, when the parallel level of the hardware is 6, one hyperblock, which includes all the basic blocks, is generated. In FIG. 24, suite 0, to which the asterisk mark (*) is attached, represents an independent hyperblock (e.g., node.hyper_block=TRUE in FIG. 7).

An explanation will now be given for a case where the parallel level of the hardware is 3. FIG. 25 is a diagram showing the shortest estimated processing times at the parallel levels 1 to 3, for the individual nodes of the series/parallel nested tree in FIG. 6, that are obtained by using the same method used when the parallel level of the hardware is 6.

First, referring to suite 2, when performed in parallel, the shortest processing time is 12 (e.g., when the parallel level of basic block B is 1 and the parallel level of suite 3 is 2). Whereas, in the gain estimation process performed in FIGS. 16 and 17, the processing time required when suite 3 and basic block B are performed with conditional branching is 10 (e.g.,=5+(6+4)/2), since at the parallel level of 3 the shortest processing times for basic block B and suite 3 are 4 and 6, respectively. Therefore, the gain is −2 (e.g.,=10−2), i.e., is smaller than 0, and suite 2 is divided into two hyperblocks (e.g., see steps 1304 and 1305 in FIG. 13).

In addition, since the shortest processing time for suite 3 is greater than that for basic block B, suite 3 is determined to be an independent hyperblock, and basic block B is included in the hyperblock that, with basic blocks A and G, constitutes the series suite (e.g., see FIG. 18).

Referring to suite 5, as described above, suite 3 is an independent hyperblock, and for suite 3, suite 5, together with basic blocks C and F, forms the series suite. Therefore, parallel level 3 of the hardware can be used as the parallel level for suite 5.

In this case, the shortest processing time for suite 5 is 4 (e.g., when the parallel levels of basic blocks D and E are 1 and 2 respectively). Whereas, in the gain estimation process shown in FIGS. 16 and 17, since the shortest processing time for each of the basic blocks D and E are 3 at a parallel level of 3, 8 (e.g.,=5+(3+3)/2) is the processing time required when the processing of basic blocks D and E are performed with conditional branching. Therefore, since the gain is 4 (e.g.,=8−4), that is greater than 0, suite 5 is assembled as one hyperblock.

As a result, basic blocks A, B and G together form one hyperblock, and basic blocks C, D, E and F form independent hyperblocks. In FIG. 25, the asterisk (*) that is appended to each of the suites 0 and 3 indicates that the suite constitutes an independent hyperblock (e.g., node.hyper_block=TRUE in FIG. 7).

Embodiment 2

An explanation will now be given for the second embodiment for providing information for the dependence paths established between the instructions in the basic block.

According to the second method, information concerning the dependence paths established between the instructions is provided for each basic block of the program. In the processing performed to estimate the execution time for each basic block, the critical path length for each of the basic blocks is re-calculated based on the dependence path.

Figure 26:
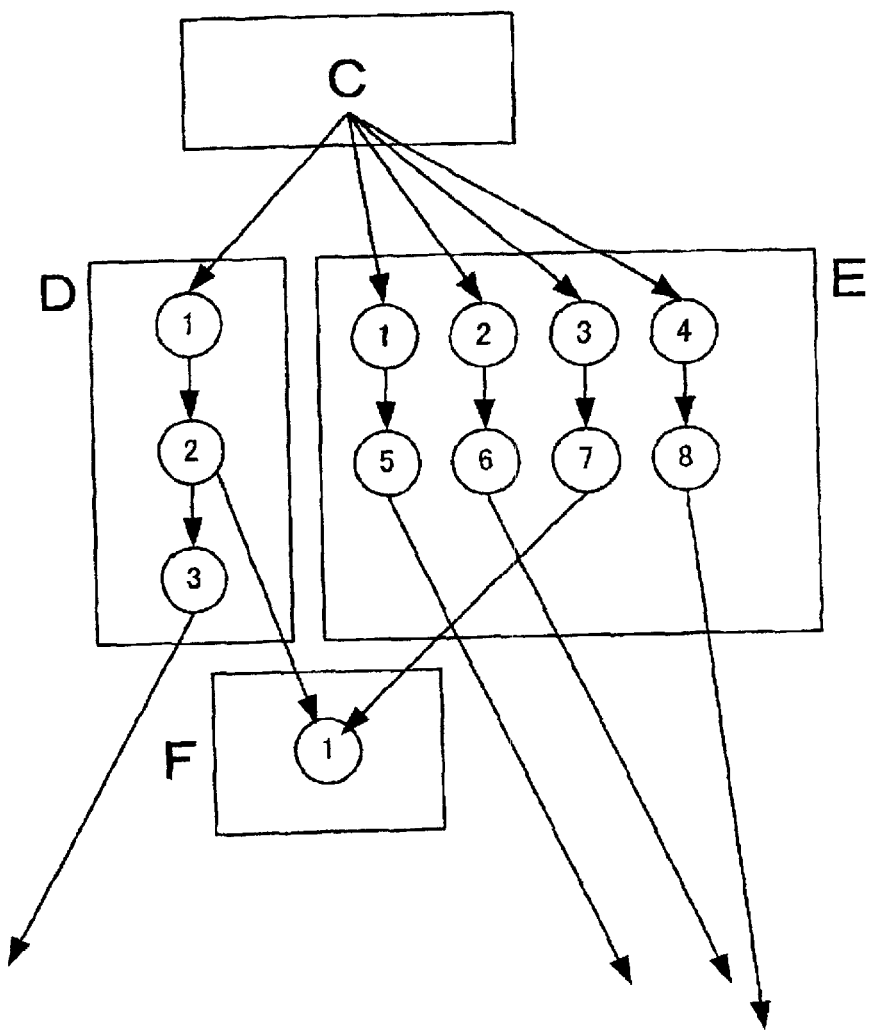
FIG. 26 is a diagram for explaining the dependencies among instructions included in the basic blocks C, D, E and F in FIG. 3.

This operation can be specifically described referring to FIG. 26 which is a diagram for explaining the dependence paths connecting instructions included in the basic blocks C, D, E and F in FIG. 3. As shown in FIG. 3, the critical path lengths of the basic blocks C, D, E and F are respectively 1, 3, 2 and 1. Therefore, according to the first method, the shortest processing times for the basic blocks C, D, E and F (e.g., corresponding to suite 3 in FIGS. 5 and 6) cannot be equal to or smaller than 5 (e.g., see the column for suite 3 in FIG. 24).

However, when the dependence paths shown in FIG. 26 are extended between the instructions for the basic blocks D, E and F, e.g., when a dependence path is extended between instruction ä of basic block D and instruction â of basic block F but no dependence path is extended between instruction ä of basic block D and instruction â of the basic block F, instruction â of the basic block F and instruction ä of the basic block D can be performed in parallel. Therefore, the shortest processing time for suite 3 can be estimated as 4, while taking into account the dependency of the instructions.

In order to implement the above processing, according to the second method, the basic block code scheduler 21 obtains information concerning the dependencies established among the instructions of the basic blocks.

Figure 27:
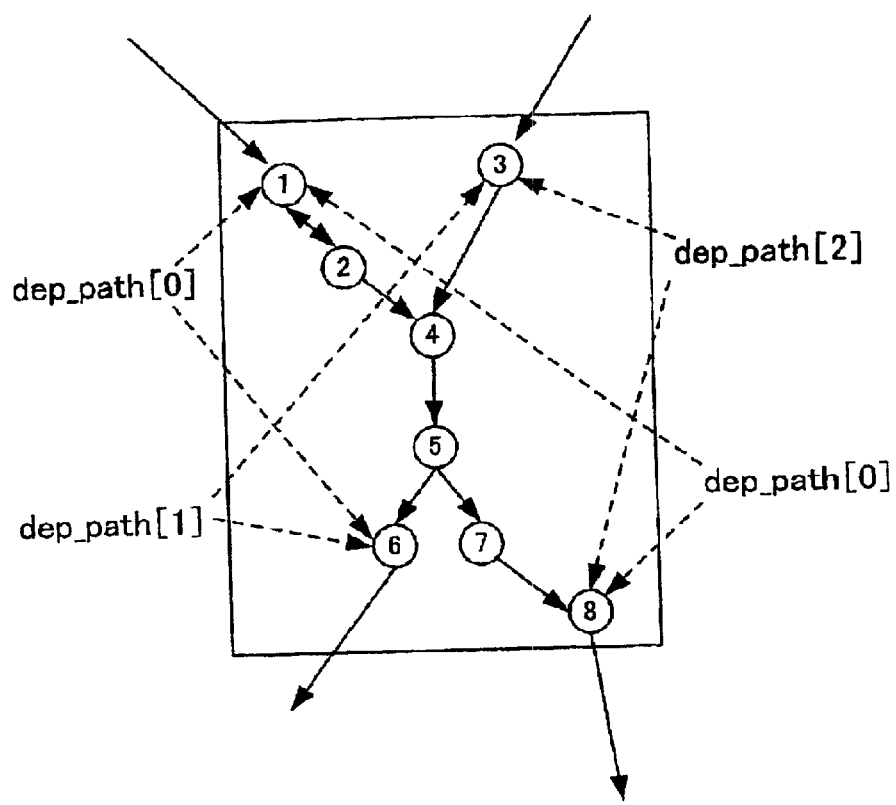
FIG. 27 is a diagram showing an image wherein all the paths in a dependence DAG are maintained by extending pointers to nodes.

First, the basic block code scheduler 21 obtains all the paths in the dependence Directed Acyclic Graph (DAG) that represents the dependencies among instructions, and arranges the obtained paths in the descending order of their lengths. FIG. 27 is a diagram showing an image where all the paths in the dependence DAG are maintained by extending pointers to the nodes.

Then, the hyperblock generator 22 performs the same process as in the first method. That is, the hyperblock generator 22 prepares a PDG based on the information provided for the basic blocks, transforms the PDG into a series-parallel graph, and using the series-parallel graph, generates a series-parallel nested tree.

Figure 10:
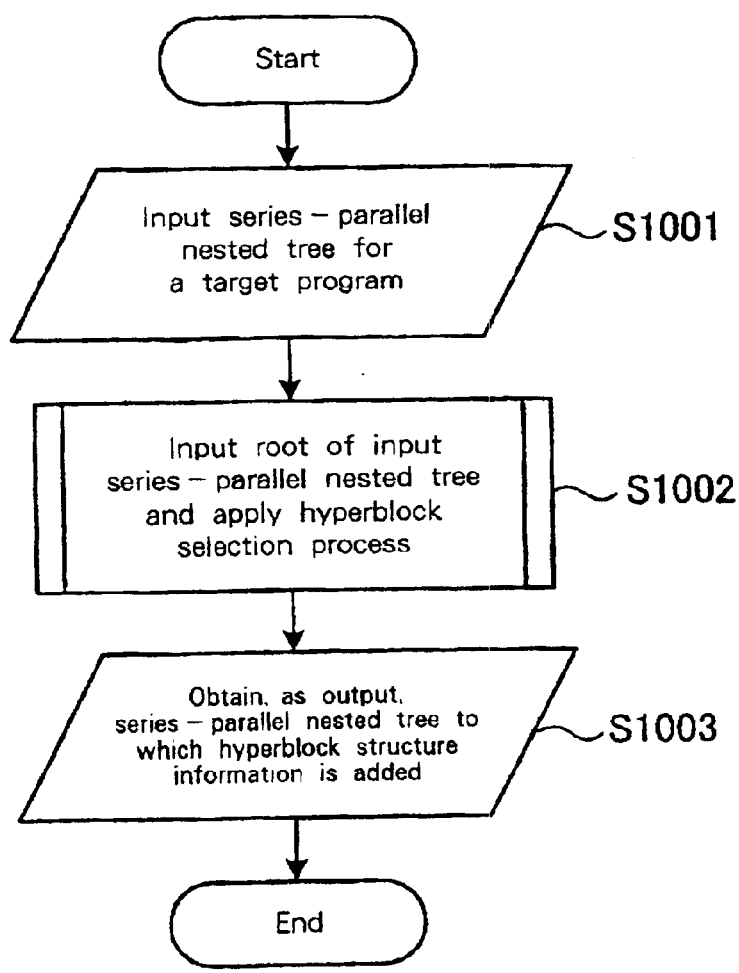
FIG. 10 is a flowchart for explaining the overall operation of a hyperblock generator according to the embodiment.

Next, the hyperblock generator 22 permits the execution time estimation unit 23 to recurrently estimate the execution times for the nodes of the series-parallel nested tree, and executes the hyperblock selection process based on the estimated execution times (e.g., see FIG. 10). During this hyperblock selection process, information is attached to each node of the series-parallel nested tree indicating whether the node should be handled as an independent hyperblock.

Therefore, the hyperblock selection process performed in accordance with the second method is performed in the same manner as it is when the first method is employed. However, while taking into account the dependencies established among the instructions of the basic blocks, the processing employed to change the critical path length of a basic block is performed as needed.

The hyperblock selection process for method two is the same as that of the first method, explained with reference to FIG. 11. Specifically, one of the nodes in the series-parallel nested tree is defined as a processing target (e.g., step 1101), and the attribute of the node is examined to determine whether the node is a parallel suite, a series suite or a basic block (e.g., an independent node of step 1102). Then, in accordance with the determination, either the process for estimating the execution time for the parallel suite (e.g., step 1103), the process for evaluating the execution time for the series suite (e.g., steps 1104 and 1105) or the process for evaluating the execution time for an independent node (e.g., step 1106) is performed.

Overall, except for the contents of the execution time evaluation process, the processing performed (e.g., step 1103) for estimating the execution time for the parallel suite is also the same as that explained for the first method while referring to FIG. 13.

Specifically, the hyperblock selection process is recurrently employed for the child node of the target node (e.g., step 1301). The execution time evaluation process for the parallel suite (e.g., step 1302) and the gain estimation process (e.g., step 1303) are performed, and the obtained gain is examined to determine whether it is greater than 0 (e.g., step 1304). If the gain is greater than 0, the node selection process is initiated (e.g., step 1305). If the gain is equal to or smaller than 0, the sum of the dimensions of the child nodes 1 and 2 (e.g., node.all, the total execution time for the target node) is defined as the dimension of the parent node (e.g., the node that is first determined to be the target in step 1306).

Figure 28:
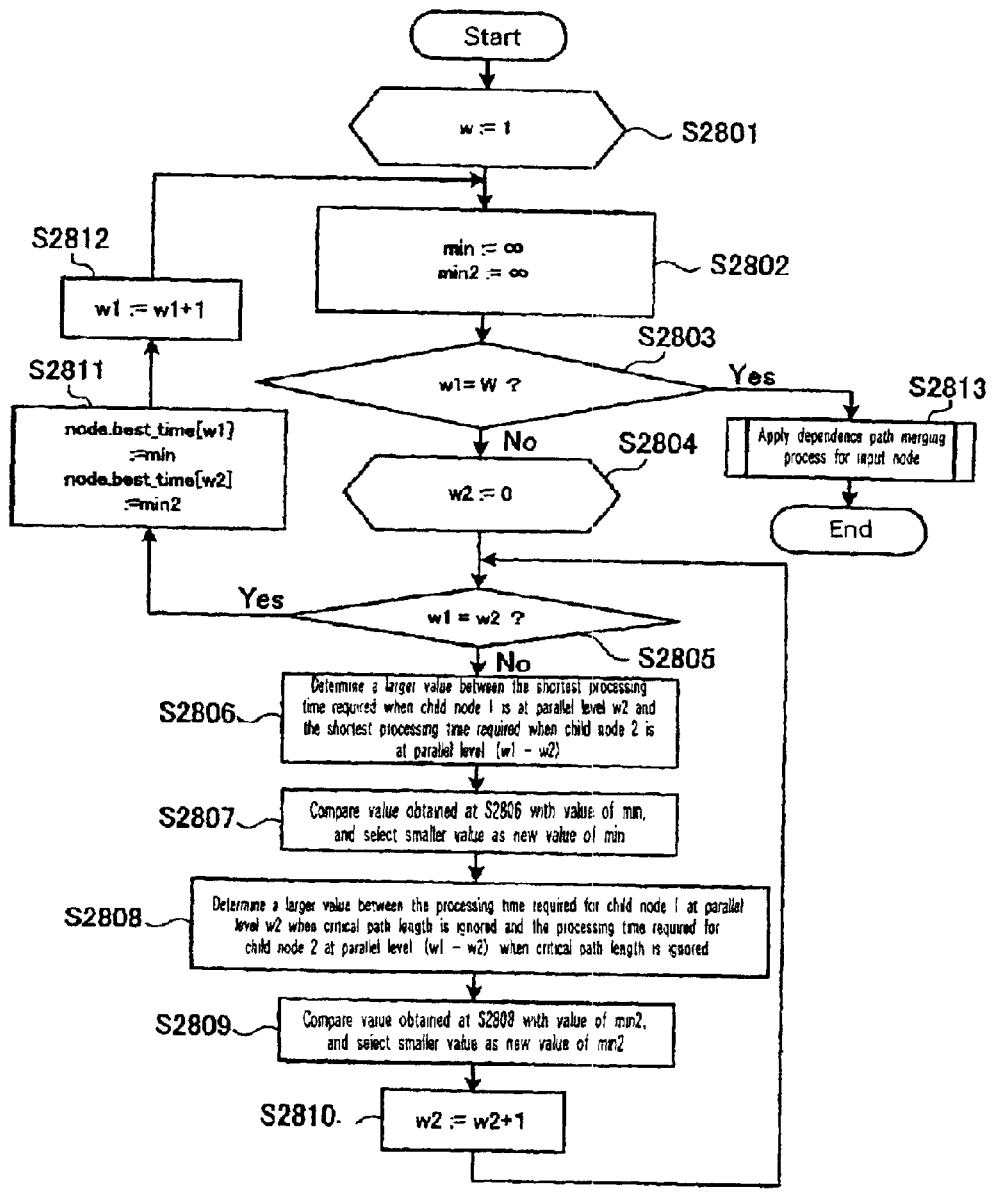
FIG. 28 is a flowchart for explaining the execution time evaluation process according to the second method.

FIG. 28 is a flowchart for explaining step 1302 in FIG. 13 for the execution time evaluation process according to the second method. FIG. 29 is a diagram showing a pseudo program for the operation algorithm of the execution time evaluation process in FIG. 28.

As shown in FIG. 28, a first step only effective in this process, is that the value of a free variable w1, is initialized to 1 (e.g., step 2801). Then, effective only in this process, the values of free variable min and min2 are initialized to infinite (e.g., step 2802). Then, the variable w1 and the parallel level W of the hardware are compared to determine whether they match (e.g., step 2803). When the variable w1 does not match the parallel level W, effective only in this process, a free variable w2 is initialized to 0 (e.g., step 2804), and the variable w2 is compared with the variable w1 to determine whether they match (e.g., step 2805).

When the variables w1 and w2 do not match, the shortest processing time obtained when the child node 1 is at the parallel level, w2, is compared with the shortest processing time obtained when child node 2 is at the parallel level (e.g., w1−w2) to determine a larger value (e.g., step 2806). The obtained value is compared with the value of a variable min, and the smaller value is determined to be a new variable min (e.g., step 2807).

Further, the processing time required when child node 1 ignores the critical path length at the parallel level w2 is compared with the processing time required when child node 2 ignores the critical path length at the parallel level (e.g., w1−w2) to determine a larger value (e.g., step 2808). The obtained value is compared with the value of a variable min2, and the smaller value is determined to be a new variable min2 (e.g., step 2809). Thereafter, the value of variable w2 is incremented by one (e.g., step 2810), and program control returns to step 2805 for the comparison.

When variables w1 and w2 match, the current value of variable min is determined as the shortest processing time when the parent node (e.g., the node that is first determined to be a processing target) is at the parallel level w1, and the current value of the variable min2 is determined to be the processing time required when the critical path length of the parent node is ignored (e.g., step 2811). Thereafter, the value of the variable w1 is incremented by one (e.g., step 2812) and program control returns to step 2802.

When the variables w1 and the parallel level W match at step 2803, the dependence path merging process (e.g., step 2813) is performed, and the execution time evaluation processing is thereafter terminated.

Figure 30:
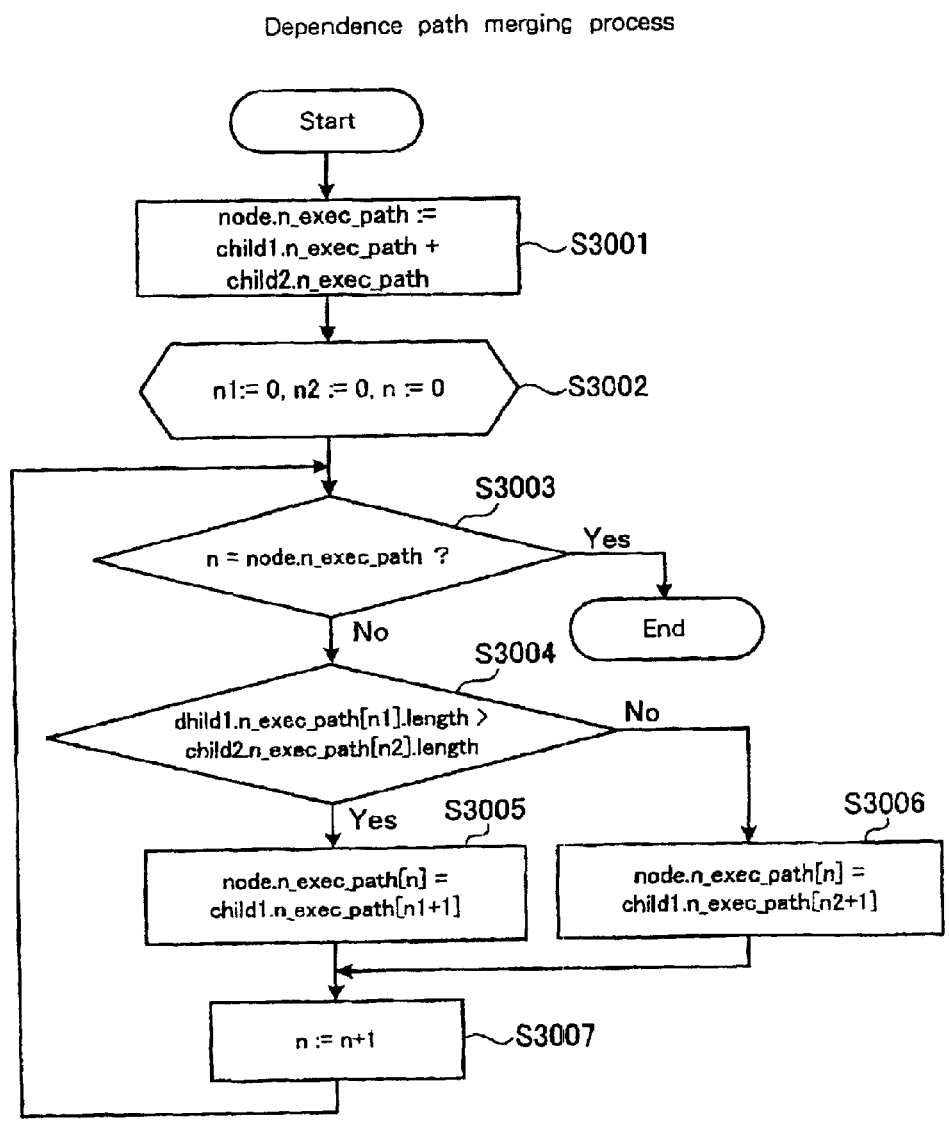
FIG. 30 is a flowchart for explaining the dependence path merging process.

FIG. 30 is a flowchart for explaining step 2813 in FIG. 28 for the dependence path merging process. A dependence path is a path representing the dependency between instructions in the dependence DAG. In FIG. 30, node.n_exec_path represents the number of dependence paths for the node.

In FIG. 30; the number of the dependence paths at the parent node is defined as the sum of the dependence paths at the child nodes 1 and 2 (e.g., step 3001). Then, effective only in this process, free variables n1, n2 and n are initialized to 0 (e.g., step 3002). Subsequently, the variable n is compared with the number of dependence paths at the parent node to determine whether the two match (e.g., step 3003).

When the variable n is not equal to the number of the dependence paths at the parent node, the length of the n1-th dependence path of the child node 1 is compared with the length of the n2-th dependence path of the child node 2 (e.g., step 3004). When the n1-th dependence path of the child node 1 is longer, the n-th dependence path of the parent node is defined as the n1-th dependence path of the child node 1, and the value of the variable n1 is incremented by one (e.g., step 3005). When the n2-th dependence path of the child node 2 is longer, the n-th dependence path of the parent node is defined as the n2-th dependence path of the child node 2, and the value of the variable n2 is incremented by one (e.g., step 3006).

After the process at step 3005 or 3006 is completed, the value of the variable n is incremented by one (e.g., step 3007), and program control returns to step 3003. When the variable n matches the number of dependence paths at the parent node, the dependence path merging process is terminated (e.g., step 3003).

Through the above processing, the shortest processing time for the parallel suite at the parallel level W can be estimated. As is described above, according to the second method, the estimated processing time (e.g., node.best_time2 in FIG. 7) required when the critical path length is ignored (e.g., the execution time value is permitted to be less than the critical path length) is also calculated. This estimated value is used to evaluate the execution time for the series suite, which will be described later.

In addition, the dependence paths are merged or sorted in the dependence path merging process. Since the dependence paths of the child nodes 1 and 2 are sorted in the descending order by the basic block code scheduler 21, this arrangement is employed to re-construct the dependence paths at the parent node.

Figure 31:
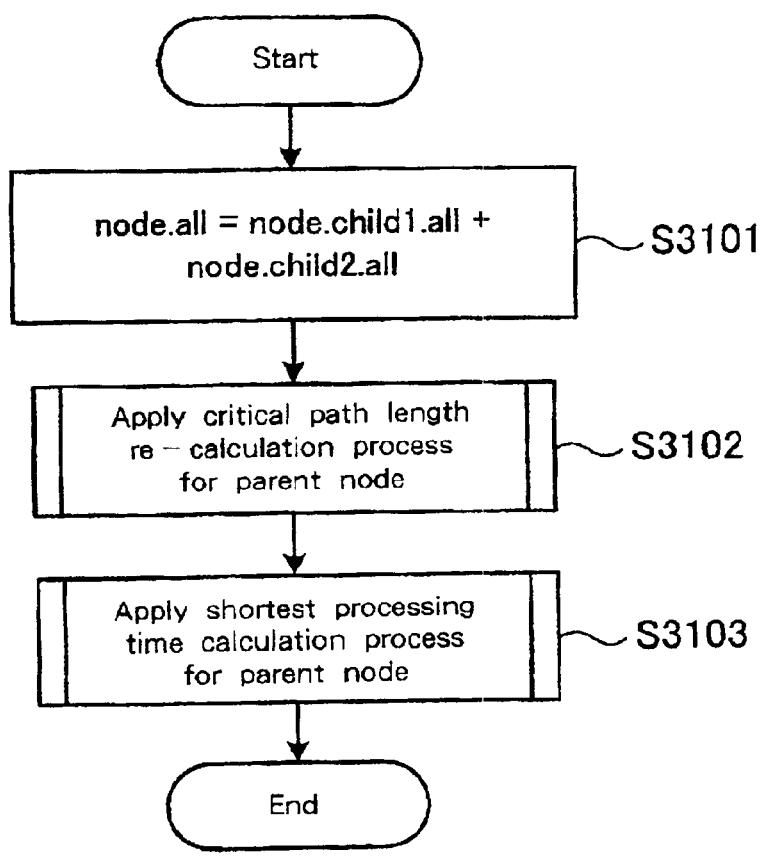
FIG. 31 is a flowchart for explaining the execution time evaluation process for a series suite according to the second method.

FIG. 31 is a flowchart for explaining step 1105 in FIG. 11 for the execution time evaluation process for the series suite according to the second method. FIG. 32 is a diagram showing a pseudo program for the operation algorithm of the execution time evaluation process in FIG. 31.

In FIG. 31, first, the total execution time for the target node is defined as the sum of the total execution time for the child nodes 1 and 2 (e.g., step 3101). Then, the critical path length re-calculation process (e.g., step 3102) and the shortest processing time calculation process (e.g., step 3103) are sequentially performed.

Figure 33:
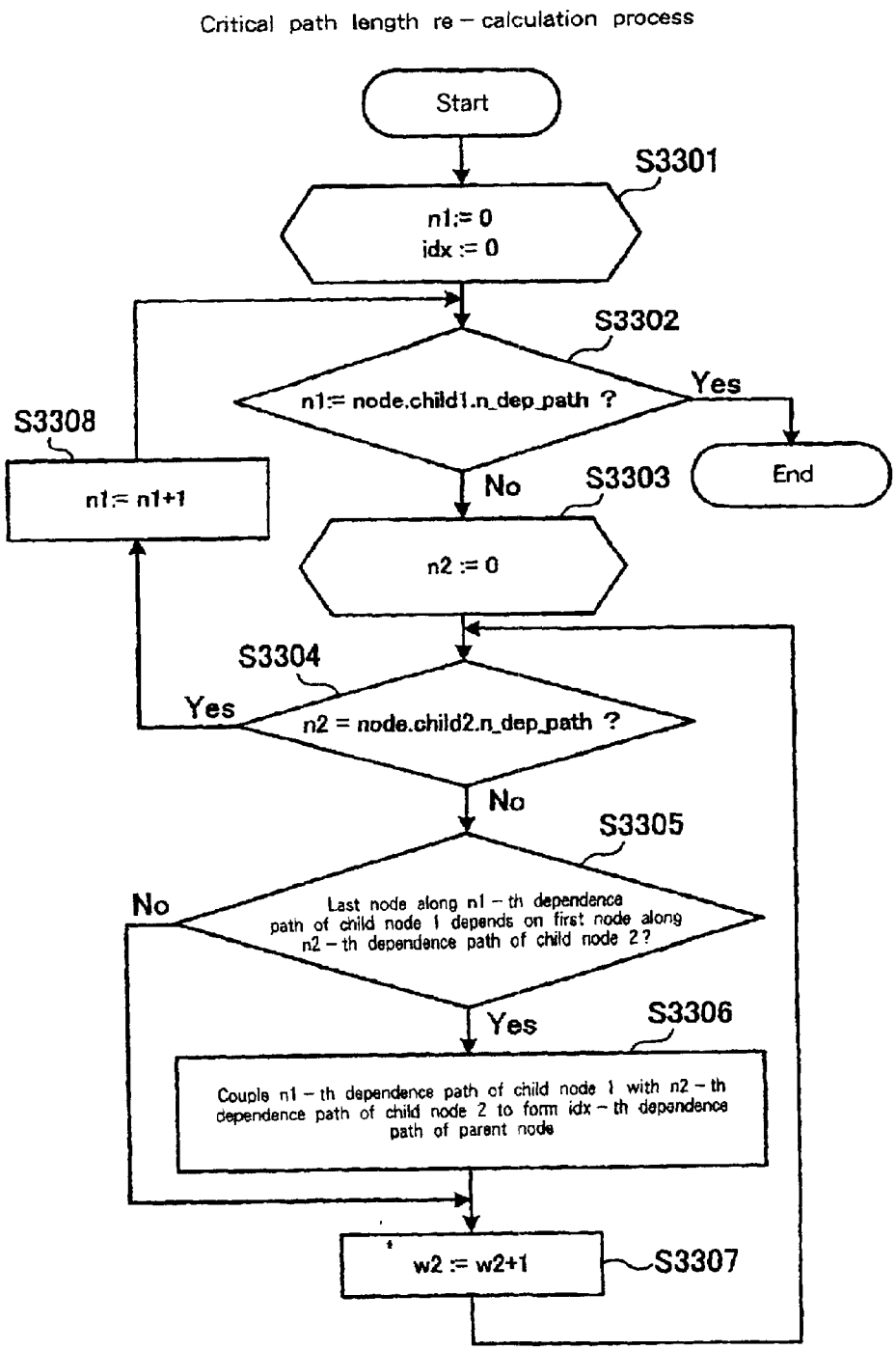
FIG. 33 is a flowchart showing the critical path length re-calculation process.

FIG. 33 is a flowchart for explaining step 3102 in FIG. 31 for the critical path length re-calculation process. In FIG. 33, first, effective only in this process, free variables n1 and idx are initialized to 0 (e.g., step 3301). The value of the variable n1 is then compared with the number of dependence paths of the child node 1 to determine whether the two match (e.g., step 3302).

When the value of the variable n1 is not equal to the number of the dependence paths of the child node 1, effective only in this process, free variable n2 is initialized to 0 (e.g., step 3303). The value of the variable n2 is then compared with the number of the dependence paths of the child node 2 to determine whether the two values match (e.g., step 3304).

When the value of the variable n2 is not equal to the number of the dependence paths at the child node 2, a check is performed to determine whether the last node along the n1-th dependence path from the child node 1 depends on the first node along the n2-th dependence path from the child node 2 (e.g., step 3305). When such a dependency is established, the n1-th dependence path of the child node 1 is coupled with the n2-th dependence path of the child node 2, and the resultant path is defined as the idx-th dependence path of the parent node (e.g., the node that is first determined to be a processing target in step 3306).

After the processing of step 3306 is completed, or when at step 3305 the last node along the n1-th dependence path from the child node 1 does not depend on the first node along the n2-th dependence path from the child node 2, the value of the variable w2 is incremented by one (e.g., step 3307). Program control thereafter returns to step 3304.

When, at step 3304, the value of the variable n2 is equal to the number of the dependence paths of the child node 2, the value of the variable n1 is incremented by one (e.g., step 3308) and program control returns to step 3302. Then, if at step 3302 the value of the variable n1 matches the number of dependence paths of the child node 1, the processing is terminated.

Through this processing, the dependence paths extended among the instructions of the child nodes of a predetermined series suite are coupled, the paths are sorted based on the length of the coupled dependence paths, and the critical path length of the series suite is re-calculated. Therefore, in accordance with the dependency between the instructions of the child node, the critical path length of the series suite can be shorter than the overall length obtained by simply adding together the critical path lengths of the child nodes.

Figure 34:
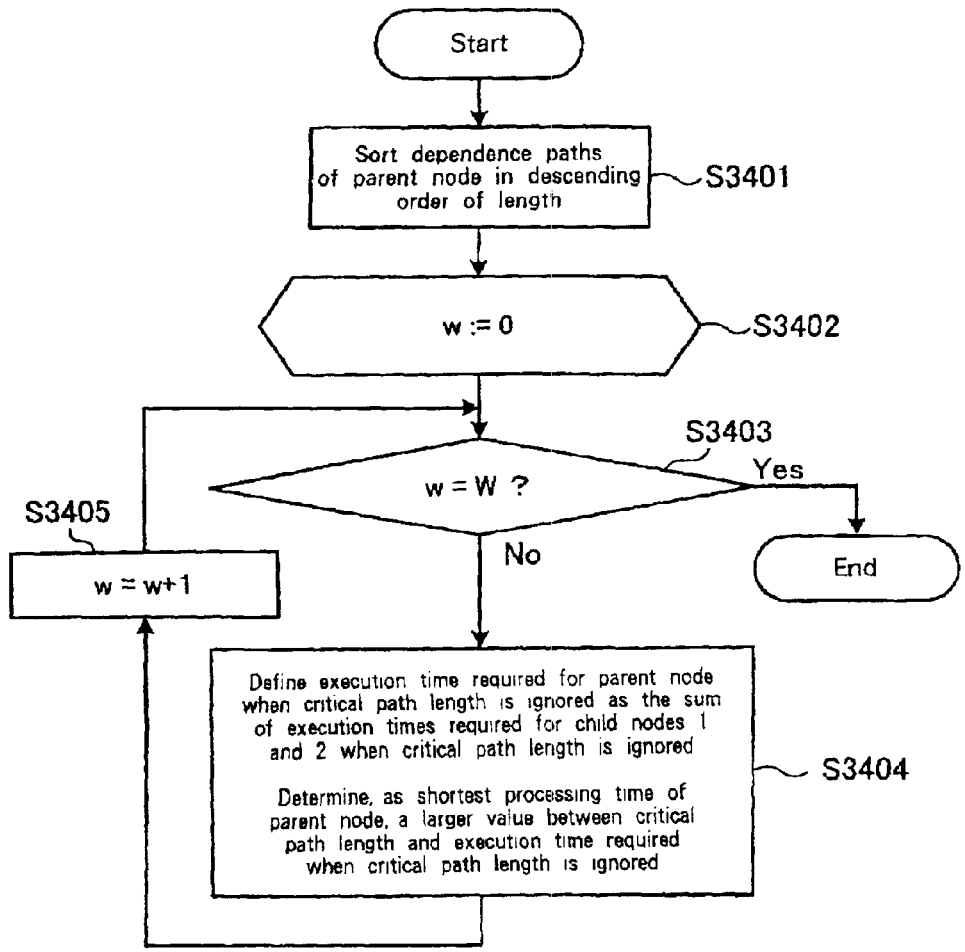
FIG. 34 is a flowchart showing the shortest processing time calculation process.

In FIG. 34, a flowchart is shown for explaining step 3103 in FIG. 31 for the shortest processing time calculation process. As shown In FIG. 34, first, the dependence paths of the parent node are sorted in the descending order of their lengths (e.g., step 3401), and, effective only in this process, the free variable w is initialized to 0 (step 3402). Then, the variable w is compared with the parallel level W of the hardware to determine whether the two match (e.g., step 3403).

When the variable w and the parallel level W do not match, the execution time for the parent node that is required when the critical path length is ignored is defined as the sum of the execution times required when the critical paths of the child nodes 1 and 2 are ignored (e.g., step 3404). The value of the variable w is incremented by one (e.g., step 3405) and program control returns to step 3403.

When the variable w and the parallel level W match at step 3403, the processing is terminated.

Through this processing, the sum of the shortest processing times required when the critical path lengths of the child nodes 1 and 2 are ignored, which is not less than the re-calculated critical path length of the series suite, can be estimated to be the shortest processing time for the series suite.

Figure 35:
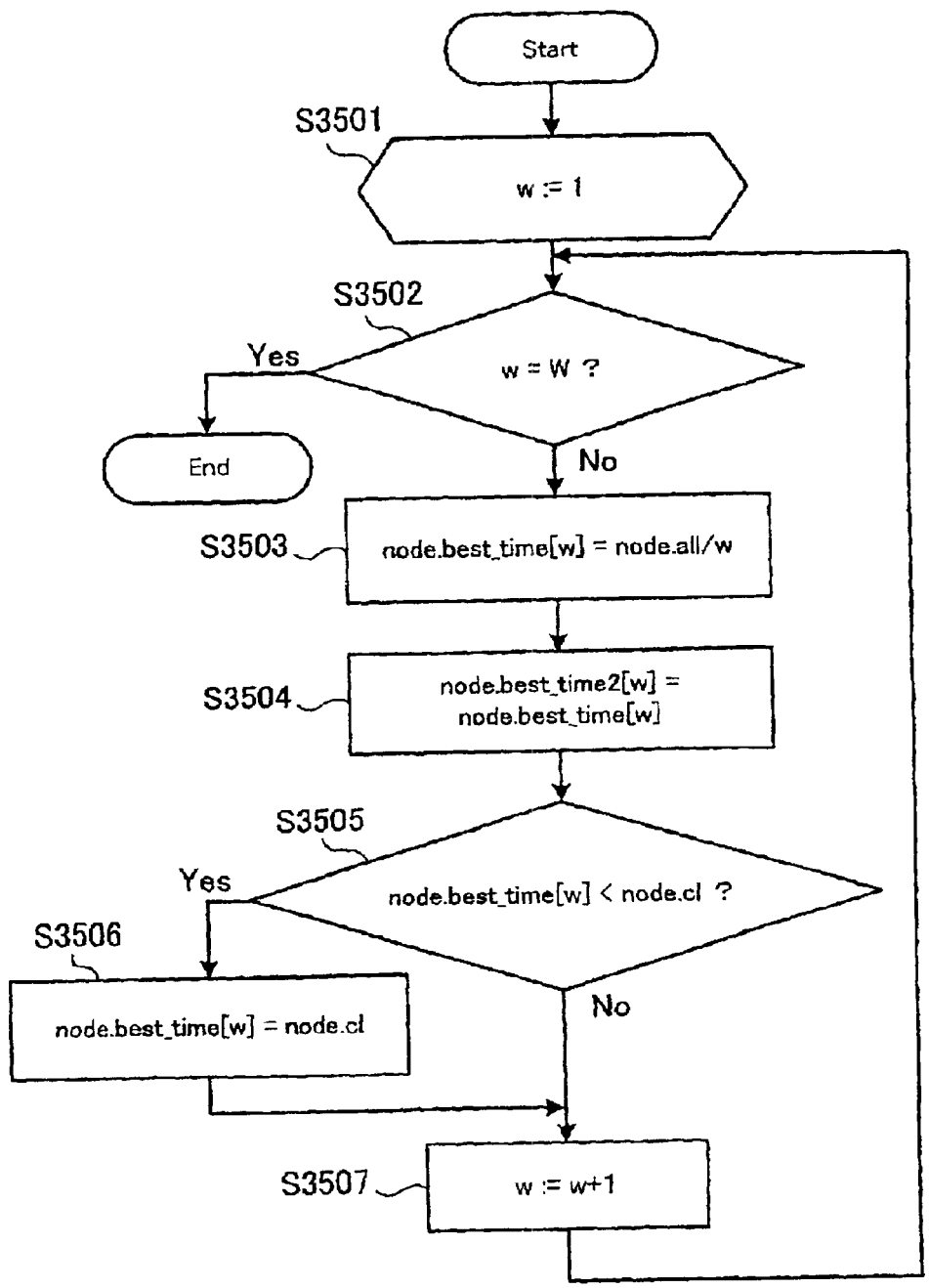
FIG. 35 is a flowchart for explaining the execution time evaluation process for an independent node according to the second method.

FIG. 35 is a flowchart for explaining step 1106 in FIG. 11 for the execution time evaluation process for the independence node. FIG. 36 is a diagram showing a pseudo program for the operation algorithm of the execution time evaluation process in FIG. 35.

In FIG. 35, first, effective only in this process, the free variable w1 is initialized to 1 (e.g., step 3501). The variable w is then compared with the parallel level W of the hardware to determine whether the two match (e.g., step 3502). When the variable w is not equal to the parallel level W, the shortest processing time for the target node is defined as a value obtained by dividing the total execution time for the basic block by the variable w (e.g., step 3503).

The execution time required when the critical path length of the target node is ignored is also defined as a value obtained by dividing the total execution time for the basic block by the variable w (e.g., step 3504). A check is then performed to determine whether the value obtained at step 3503 is smaller than the value representing the critical path length of the basic block (e.g., step 3505).

When the shortest processing time for the target node obtained at step 3503 is less than the value representing the critical path length of the basic block, the shortest processing time for the node is defined as the critical path length of the basic block (e.g., step 3506).

When the shortest processing time for the target node obtained at step 3503 is not less than the value representing the critical path length of the basic block, or when the process at step 3506 has been completed, the value of the variable w is incremented by one (e.g., step 3507) and program control returns to step 3502.

When the variable w and the parallel level W match at step 3502, the processing is terminated.

According to the above described second method, the basic block code scheduler 21 sorts the dependence paths in the dependence DAG. This process requires a calculation time proportional to mlog m, where m denotes the number of dependence paths. Further, a calculation time proportional to $m^2$, at the maximum, is required to connect the dependence paths, and a calculation time proportional to mlog m is also required for sorting the obtained dependence path.

Therefore, the above processing requires a calculation time that is proportional to $nm^2$, at the maximum. However, when the portion of the program to be optimized is divided into many basic blocks, the number m of the dependence paths is small. Thus, actually, a long calculation time is not required to sort the paths.

An example will now be provided of the calculations performed to obtain the shortest processing time according to the second method.

Referring to FIG. 37, a diagram shows the estimated shortest processing times for the program in FIGS. 2 and 3, at the parallel levels 1 to 6, that are provided by the second method for each node (e.g., suite) of the series-parallel nested tree in FIG. 6. Further, FIG. 38 is a diagram showing the estimated shortest processing times that are provided in the same manner when the critical path length of the basic block is ignored. Also, the dependencies existing among the instructions of the basic blocks D, E and F are shown in FIG. 26.

When the table in FIG. 37 is compared with the table in FIG. 24 for the shortest estimated processing times provided by the first method, the dependencies of the instructions of the basic blocks D, E and F appear in the estimated results for suite 3. Suite 3 is a series suite formed of the basic block F and the suite 4. In the table of FIG. 37, the shortest processing time for suite 3 at the parallel level of 6 is 4, which is smaller by one than the 5 in the table in FIG. 24. It is apparent that this value is not less than the value representing the critical path length obtained by re-calculation, because the shortest processing time at the pertinent portion in FIG. 38 is 4. Therefore, the shortest processing time for suite 3 is estimated as 4, and better optimization of the program is obtained than is provided by the first method.

As is described above, according to the present invention, since, during the optimization process, appropriate hyperblocks can be quickly generated for a predetermined area in a program, the execution efficiency can be increased for many paths whose execution probability is high.

While the invention as been described above in terms of preferred embodiments, those skilled in the art will recognize that the invention can be practiced with modification within the spirit and scope of the appended claims.

Having thus described our invention, what we claim as new and desire to secure by Letters Patent is as follows:

1. An optimization method for converting source code for a program written in a programming language into machine language and for optimizing said program, said method comprising:

employing a basic block as a unit to estimate an execution time for said program to be processed;

generating a nested tree that represents connections of said basic blocks using a nesting structure;

when a conditional branch is accompanied by a node in said nested tree, employing said execution time estimated by using said basic blocks as units to obtain an execution time at said node of said program when a conditional branching portion of a program is directly executed and when said conditional branching portion is executed in parallel; and defining said node as a parallel execution area group when, as a result of an estimate, said execution time required for parallel execution is shorter, or dividing multiple child nodes of said nodes into multiple parallel execution areas when said execution time for the conditional branching portion is shorter.

2. The optimization method according to claim 1, wherein said estimating said execution time for said program using said basic block as a unit includes employing said estimated execution time to obtain the critical path length for the program portion in said basic block, and the average parallel level of said program portion.

3. The optimization method according to claim 1, wherein said generating said nested tree comprises:

generating a dependency graph that represents a dependency existing between said basic blocks;

generating a preceding limitation graph by removing redundant branches from said dependency graph; and generating said nested tree in said preceding limitation graph by using a nesting structure to represent a connection including node relationships.

4. The optimization method according to claim 1, wherein said determining said execution time for said conditional branching portion comprises:

obtaining, for each of said parallel levels executable for said child node, a maximum execution time required when said child node is executed in parallel; and regarding a specific value derived from maximum execution values of said parallel levels as the execution time that is required when said conditional branching portion is executed in parallel.

5. The optimization method according to claim 1, wherein said determining said execution time for said conditional branching portion comprises:

employing a dependency at an instruction level between said basic blocks that serve as said child nodes to, before the determination of said execution time, correct information concerning execution times for said basic blocks.

6. The optimization method according to claim 1, wherein said determining said parallel execution area for said program comprises:

comparing, when multiple child nodes are sorted into multiple parallel execution areas, the execution times required for said child nodes when said child nodes are executed in parallel at the parallel level provided for the hardware; and defining, as independent parallel execution areas, child nodes other than the child node whose execution time is shortest.

7. An optimization method for converting source code for a program written in a programming language into machine language and for optimizing said program, said optimization method comprising:

estimating an execution time when a conditional branching portion of said program is to be executed by a computer that can execute a predicated instruction and that can perform parallel execution at an instruction level;

if said estimated execution time is shorter than a time required for execution of said conditional branching portion, rewriting said conditional branching portion as a parallel execution portion at a predicated instruction, wherein said estimating said execution time required for said parallel execution includes:

estimating an execution time for said program by using basic blocks as the units, and employing said estimated execution time to obtain the critical path length for the program portion in each of said basic blocks, and an average parallel level of said program portion, employing said critical path length and said average parallel level to obtain, for each of said executable parallel levels, a maximum execution time required when said basic blocks, which are destinations from said conditional branching portion, are executed in parallel, and regarding a specific value derived from maximum execution values of said parallel levels as an execution time that is required when said conditional branching portion is executed in parallel.

8. The optimization method according to claim 7, wherein said obtaining said critical path length of said basic block and said average parallel level includes defining, as said critical path length, one of values of two adjacent sides of said basic block, and the other value as said average parallel level, and representing said basic block using a rectangle deformable within a range where a side corresponding to said critical path length is not smaller than said critical path length.

9. The optimization method according to claim 7, wherein said estimating said execution time of said conditional branching portion includes, before determination of said execution time, employing a dependency among instructions of said basic blocks to correct information about said execution times of said basic blocks.

10. A computer system comprises a compiler for converting source code for a program written in a programming language into machine language and for optimizing said program, said compiler comprising:

a first code scheduler for estimating an execution time for said program by using basic blocks as units;

a hyperblock generator for assembling said basic blocks to generate hyperblocks as parallel execution areas;

an execution time estimation unit for supporting generation of said hyperblocks by said hyperblock generator by estimating a processing time required when a predetermined area of said program is executed; and a second code scheduler for performing code scheduling for each of said generated hyperblocks, wherein, when a predetermined node of a nested tree for which a connection of said basic blocks is represented using a nesting structure, based on said execution time, which has been estimated by using said basic blocks as units, said execution time estimation unit estimates an execution time required for said node of said program both for when a conditional branching portion of a program is directly executed and when said conditional branching portion is executed in parallel, and wherein said hyperblock generator defines, as one parallel execution area group, a node for which the execution time estimated for the parallel execution by said execution time estimation unit is shorter, or for dividing, into multiple parallel execution areas, multiple child nodes of said node for which the execution time is shorter when execution of said conditional branching portion is directly performed.

11. The compiler according to claim 10, wherein said first code scheduler employs said execution time estimated by using said basic blocks as units to obtain a critical path length for a program portion in said basic block and the average parallel level of said program portion.

12. The compiler according to claim 10, wherein said execution time estimation unit obtains, for each of said parallel levels executable for said child node, a maximum execution time required when said child node is executed in parallel, and regards a specific value derived from maximum execution values of said parallel levels as the execution time that is required when said conditional branching portion is executed in parallel.

13. The compiler according to claim 10, wherein, before determination of said execution time, said execution time estimation unit employs a dependency at an instruction level between said basic blocks that serve as said child nodes to correct information concerning execution times for said basic blocks.

14. A computer-readable program for controlling a computer stored on a storage medium accessible by an input device of a computer, said computer-readable program comprising:

a process for employing a basic block as a unit to estimate an execution time for said program to be processed;

a process for generating a nested tree that represents connections of said basic blocks using a nesting structure;

a process for, when a conditional branch is accompanied by a node in said nested tree, employing execution time estimated by using said basic blocks as units to determine a shorter execution time at said node of said program, for at least one of when a conditional branching portion of a program is directly executed and when said conditional branching portion is executed in parallel; and a process for defining said node as one parallel execution area group when said execution time required for parallel execution is shorter, or for dividing multiple child nodes of said nodes into multiple parallel execution areas when said execution time for the conditional branching portion is shorter.

15. A program transmission apparatus, comprising:
a storage device for storing a program that permits a computer to perform:
  a process for employing a basic block as a unit to estimate an execution time for said program to be processed;
  a process for generating a nested tree that represents connections of said basic blocks using a nesting structure;
  a process for, when a conditional branch is accompanied by a node in said nested tree, employing said execution time estimated by using said basic blocks as units to determine a shorter execution time at said node of said program, for at least one of when a conditional branching portion of a program is directly executed and when said conditional branching portion is executed in parallel;
  a process for defining said node as one parallel execution area group when said execution time required for the parallel execution is shorter, or for dividing multiple child nodes of said nodes into multiple parallel execution areas when said execution time for the conditional branching portion is shorter; and
a transmission device for reading said program from said storage device and transmitting said program.

* * * * *